(12) United States Patent
Gysling et al.

(10) Patent No.: US 6,601,458 B1
(45) Date of Patent: Aug. 5, 2003

(54) DISTRIBUTED SOUND SPEED MEASUREMENTS FOR MULTIPHASE FLOW MEASUREMENT

(75) Inventors: Daniel L. Gysling, Glastonbury, CT (US); Mark R. Myers, Storrs, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/519,785

(22) Filed: Mar. 7, 2000

(51) Int. Cl.$^7$ ................................................. G01F 1/74

(52) U.S. Cl. .................................. 73/861.04; 73/861.27

(58) Field of Search ..................... 73/861.04, 861.05, 73/861.18, 861.25, 861.26, 861.27, 861.28, 861.29, 861.31

(56) References Cited

U.S. PATENT DOCUMENTS

| 3,149,492 A | 9/1964 | Weinberg |
| 3,851,521 A | 12/1974 | Ottenstein |
| 4,080,837 A | 3/1978 | Alexander et al. ........ 73/61.1 R |
| 4,114,439 A | 9/1978 | Fick |
| 4,144,768 A | 3/1979 | Andersson |
| 4,159,646 A | 7/1979 | Paulsen |

(List continued on next page.)

FOREIGN PATENT DOCUMENTS

| DE | 19511234 | 12/1995 |
| EP | 0684458 | 5/1995 |
| FR | 2 357 868 | 7/1976 |
| JP | 406082281 | 9/1992 |
| WO | WO 93/14382 | 7/1993 |
| WO | WO 96/04528 | 2/1996 |
| WO | WO 00/00793 | 1/2000 |

OTHER PUBLICATIONS

Mesch, F. (1990) "Speed and Flow Measurement by an Intelligent Correlation System", Advances in Instrumentation and Control, Research Triangle Park, NC, part 4, p. 1899–1914.
Specification for US Patent Application Ser. No. 09/344,069, filed Jun. 25, 1999, Attorney docket: WEAF:106.
Gysling, D. (1999) "Development of Fiber Optic Downhole Multiphase Flow Meter", in "Field Applications & New Technologies for Multiphase Metering", Multiphase Technology Series Conference, Aberdeen, Scotland.
Beranek, L. and Ver, I. (1992) in "Noise and Vibration Control Engineering, Principles and Application", John Wiley & Sons, Inc., Chapter 14, p:537–541.
Dowling, A. and Williams, J. in "Sound Sources of Sound", Ellis Horwood Limited, Section 4, p:79–80.
Kersey, A. et al. (1993) "Multiplexed Fiber Bragg Grating Strain–Sensor System with a Fiber Fabry–Perot Wavelength Filter", Optics Letters, 18:1370–1372.
Dandridge, A. & Cogdell, G. (1991) "Fiber Optic Sensors for Navy Applications", IEEE, LCS, 2:81–89.
Nielsen, R. (1991) "Sonar Signal Processing", Artech Huse Inc., Chapter 2, p:51–59.
Krim A. and Viberg M. (1996) "Two Decades of Array Signal Processing Research", IEEE Signal Processing Magazine, p:67–94.

(List continued on next page.)

*Primary Examiner*—Max Noori
(74) *Attorney, Agent, or Firm*—Howrey Simon Arnold & White, LLP

(57) ABSTRACT

A multiphase flow meter is presented based on distributed sensors that provide data pertaining to temperature, pressure, phase fraction, speed of sound, and bulk velocity. The data is provided to a model that calculates the multiphase flow rates. The sensors are comprised of various combinations of temperature and pressure sensors combined with speed of sound and/or bulk velocity sensors and are distributed at various axial positions along an oil production pipe. In one embodiment the sensors comprise Bragg grating based optical sensors.

34 Claims, 16 Drawing Sheets

U.S. PATENT DOCUMENTS

| | | | |
|---|---|---|---|
| 4,164,865 A | 8/1979 | Hall | |
| 4,236,406 A | 12/1980 | Reed | |
| 4,275,602 A | 6/1981 | Fujishiro | |
| 4,445,389 A | 5/1984 | Potzick et al. | 73/861.27 |
| 4,499,418 A | 2/1985 | Helms et al. | 324/58.5 |
| 4,515,473 A | 5/1985 | Mermelstein | |
| 4,520,320 A | 5/1985 | Potzick et al. | 328/133 |
| 4,546,649 A | 10/1985 | Kantor | |
| 4,706,501 A | 11/1987 | Atkinson | |
| 4,788,852 A * | 12/1988 | Martin et al. | 73/861.04 |
| 4,813,270 A * | 3/1989 | Baillie | 73/861.04 |
| 4,862,750 A | 9/1989 | Nice | |
| 4,864,868 A | 9/1989 | Khalifa | |
| 4,884,457 A * | 12/1989 | Hatton | 73/861.04 |
| 4,896,540 A | 1/1990 | Shakkottai | |
| 4,932,262 A | 6/1990 | Wlodarczyk | |
| 4,947,127 A | 8/1990 | Helms et al. | 324/640 |
| 4,950,883 A | 8/1990 | Glenn | |
| 4,976,151 A | 12/1990 | Morishita | |
| 4,996,419 A | 2/1991 | Morey | |
| 5,024,099 A | 6/1991 | Lee | |
| 5,031,460 A | 7/1991 | Kanekobu | |
| 5,040,415 A | 8/1991 | Barkhoudarian | 73/198 |
| 5,051,922 A | 9/1991 | Toral | |
| 5,058,437 A | 10/1991 | Chaumont | |
| 5,083,452 A | 1/1992 | Hope | 73/61 R |
| 5,099,697 A * | 3/1992 | Agar | 73/861.04 |
| 5,115,670 A | 5/1992 | Shen | |
| 5,152,181 A | 10/1992 | Lew | |
| 5,207,107 A | 5/1993 | Wolf | |
| 5,218,197 A | 6/1993 | Carroll | 250/227.19 |
| 5,317,576 A | 5/1994 | Leonberger | |
| 5,321,991 A | 6/1994 | Kalotay | |
| 5,347,873 A | 9/1994 | Vander Heyden | |
| 5,361,130 A | 11/1994 | Kersey | |
| 5,363,342 A | 11/1994 | Layton et al. | 367/149 |
| 5,367,911 A | 11/1994 | Jewell | |
| 5,372,046 A | 12/1994 | Kleven | |
| 5,398,542 A | 3/1995 | Vasbinder | 73/40.5 |
| 5,401,956 A | 3/1995 | Dunphy | |
| 5,421,212 A * | 6/1995 | Mayranen et al. | 73/861.29 |
| 5,426,297 A | 6/1995 | Dunphy | |
| 5,440,932 A | 8/1995 | Wareham | |
| 5,493,390 A | 2/1996 | Varasi | |
| 5,493,512 A | 2/1996 | Peube | |
| 5,513,913 A | 5/1996 | Ball | |
| 5,564,832 A | 10/1996 | Ball | |
| 5,576,497 A | 11/1996 | Vignos | |
| 5,591,922 A | 1/1997 | Segeral et al. | 73/861.04 |
| 5,597,961 A | 1/1997 | Marrelli | |
| 5,639,667 A | 6/1997 | Heslot | |
| 5,642,098 A | 6/1997 | Santa Maria et al. | |
| 5,644,093 A | 7/1997 | Wright | |
| 5,654,551 A * | 8/1997 | Watt et al. | 73/861.04 |
| 5,670,720 A | 9/1997 | Clark | |
| 5,680,489 A | 10/1997 | Kersey | |
| 5,689,540 A | 11/1997 | Stephenson | |
| 5,708,211 A | 1/1998 | Jepson | |
| 5,730,219 A | 3/1998 | Tubel | |
| 5,732,776 A | 3/1998 | Tubel | |
| 5,741,980 A | 4/1998 | Hill et al. | 73/861.04 |
| 5,803,167 A | 9/1998 | Bussear | |
| 5,804,713 A | 9/1998 | Kluth | |
| 5,842,347 A | 12/1998 | Kinder | |
| 5,845,033 A | 12/1998 | Berthold et al. | 385/12 |
| 5,906,238 A | 5/1999 | Carmody | |
| 5,907,104 A | 5/1999 | Cage | |
| 5,908,990 A | 6/1999 | Cummings | |
| 5,925,821 A | 7/1999 | Bousquet | |
| 5,925,879 A | 7/1999 | Hay | |
| 5,932,793 A * | 8/1999 | Dayton et al. | 73/24.05 |
| 5,939,643 A | 8/1999 | Oertel | |
| 5,956,132 A | 9/1999 | Donzier | 356/133 |
| 5,959,547 A | 9/1999 | Tubel | |
| 5,963,880 A | 10/1999 | Smith | |
| 5,975,204 A | 11/1999 | Tubel | |
| 5,992,519 A | 11/1999 | Ramakrishnan | |
| 5,996,690 A | 12/1999 | Shaw | |
| 6,002,985 A | 12/1999 | Stephenson | |
| 6,003,383 A | 12/1999 | Zielinska et al. | 73/861.22 |
| 6,003,385 A | 12/1999 | De Vanssay et al. | 73/861.22 |
| 6,009,216 A | 12/1999 | Pruett | |
| 6,016,702 A | 1/2000 | Maron | |
| 6,158,288 A | 12/2000 | Smith | |
| 6,216,532 B1 * | 4/2001 | Stephenson | 73/152.21 |
| 6,233,374 B1 | 5/2001 | Ogle | |
| 6,279,660 B1 | 8/2001 | Hay | |
| 6,286,360 B1 * | 9/2001 | Drzewiecki | 73/24.01 |
| 6,354,147 B1 | 3/2002 | Gysling | |

OTHER PUBLICATIONS

Kersey A. and Darkin, J., Editors (1992) SPIE vol. 1586, "Distributed and Multiplexed Fiber Optic Sensors", p:1–243.

Nerby et al. "a cost effective technique for production well testing", (1995) Offshore Technology Conference, p:505–515.

* cited by examiner

DISTRIBUTED SOUND SPEED MEASUREMENTS FOR MULTIPHASE FLOW MEASUREMENT

TECHNICAL FIELD

This invention relates to distributed multiphase flow measurement systems to monitor multiphase flow production. More particularly the present invention incorporates sound speed measurements and/or bulk velocity measurements to fundamentally improve the ability of distributed multiphase flow measurement systems to monitor multiphase flow production.

BACKGROUND ART

It is widely recognized that the ability to measure the individual flow rates of oil/water/gas within co-flowing mixtures of these substances has substantial economic value for the oil and gas industry. The industry has been actively developing multiphase flow meters for the past 20 years. During this development process, many techniques have been identified, evaluated, refined, and commercialized.

The numerous approaches to multiphase flow measurement of the prior art can typically be divided into two main categories of multiphase flow meters (MPFM's). The first category seeks to develop instruments to measure the oil/water/gas flow rates based on localized measurement. This is a typical industry approach in which a variety of measurements are made on the oil/gas/water mixture to help determine the flow rates of the individual components. This approach has focused on developing novel and robust instruments designed to provide precise multiphase flow measurements, such as dual-intensity gamma densitomers, microwave meters, capacitance and conductance meters, etc. Typically MPFM's are a collection of several essentially separate, but collocated measurement devices that provide a sufficient number of measurements to uniquely determine the flow rate at the meter location. Prior art multiphase flow meter manufacturers for monitoring hydrocarbon production include Roxar, Framo, and Fluenta, among others. These MPFM's are typically restricted to operate above the well, either on the surface or subsea, for various reasons including reliability in the harsh environment and complications due to the presence of electrical power. Since the MPFM's typically operate at pressures and temperatures determined by production conditions and operators are typically interested in oil and gas production at standard conditions, the flow rates measured at the meter location are translated to standard conditions through fluid properties data (Pressure, Temperature, and Volumetric properties (PVT)).

The second category of prior art MPFM's provides multiphase flow rate information by utilizing measurements distributed over the production system in conjunction with a mathematical description, or model, of the production system. The mathematical model utilizes multiphase flow models to relate the parameters sought to estimates for the measured parameters. The flow rates are determined by adjusting the multiphase flow rates to minimize the error between the distributed measurements and those predicted by the mathematical model. The type, number, and location of the measurements that enter into this global minimization process to determine flow rates can vary greatly, with cost, reliability and accuracy all entering into determining the optimal system.

Several prior art MPFM's have been developed utilizing distributed measurements to estimate production flow rates. Owing to the availability and relatively low cost and reliability of conventional pressure and temperature measurements, these systems have typically tended to focus on utilizing only distributed pressure and temperature measurements to determine flow rates. Unfortunately, the physics linking sparse pressure and temperature measurements to flow rates is rather indirect and relies on estimates of several, often ill-defined flow system properties such as viscosity and wall surface roughness. Thus, although it is theoretically possible to determine flow rates from a limited number of pressure and temperature measurements, it is generally difficult for such systems to match the accuracy of a dedicated multiphase flow measurement system as described above.

The distributed measurement approaches are fundamentally rooted in the relationship between flow rates and pressure and temperature. Specifically, pressure drop in flow within a pipe is due primarily to viscous losses which are related to flow rate and hydrostatic head changes which are related to density of fluid and hence composition. Axial temperature gradients are primarily governed by the radial heat transfer from the flow within the production tubing into the formation as the flow is produced and is related to the heat capacity of the fluid and the flow rate. The pressure drop and temperature losses are used to predict flow rates. The fundamental problem with this approach is that the relationship between flow rate and either of these two parameters is highly uncertain and often must be calibrated or tuned on a case-by-case basis. For instance, it is known that it is extremely difficult to accurately predict pressure drop in multiphase flow.

It is also recognized that the accuracy of distributed measurement systems utilizing pressure and temperature measurements can be improved utilizing additional phase fraction measurements provided by prior art sensors such as density, dielectric, and sound wave measurements. These auxiliary phase fraction measurements and/or volumetric flow rate measurements are performed by auxiliary sensors that constrain the global optimization for specific variables at specific locations. In addition to enhancing the overall accuracy and robustness, the auxiliary sensors reduce the need for in-situ tuning of the optimization procedure required to produce accurate results.

What is needed is a robust and accurate sensor apparatus for providing temperature, pressure and other flow related parameters to multiphase flow models. It is further necessary to provide a sensor that can survive in harsh downhole environments.

SUMMARY OF THE INVENTION

Objects of the present invention include provision of a system to provide multiphase flow information for a fluid within a pipe.

According to the present invention, an apparatus is provided for measuring a flow rate of a multiphase fluid in a pipe comprising sensors or sensor systems distributed at axial locations along the pipe measuring pressure, temperature, speed of sound, and/or velocity of the fluid at a location along the pipe, and providing signals indicative of the pressure, the temperature, the speed of sound, and the velocity of the fluid. A multi-phase flow model responsive to the signals provides a signal indicative of the flow rate of the multi-phase fluid.

According further to the invention, the model comprises logic that calculates the flow rate of the multi-phase fluid. According still further, the sensor or sensor systems are fiber optic based. Still further, the sensors comprise at least one fiber optic Bragg grating based sensor.

The present invention further provides an apparatus for measuring a flow rate of a multiphase fluid in a pipe comprising a spatial array of at least two pressure and temperature sensors, disposed at different axial locations along the pipe, and each measuring a pressure and a temperature of the fluid within the pipe at a corresponding axial location. Each of the sensors provides a signal indicative of the pressure and temperature of the fluid within the pipe at the corresponding axial location. A multi-phase flow model responsive to the signals provides a signal indicative of the flow rate of the multi-phase fluid.

The present invention further provides an apparatus for measuring a flow rate of a multiphase fluid in a pipe comprising a spatial array of two sensors or sensor systems disposed at different axial locations along the pipe. The spatial array comprising the first sensor or sensor system measures a pressure and a temperature of the fluid within the pipe at a corresponding axial location and provides a signal indicative of the pressure and temperature of the fluid within the pipe at the axial location of the first sensor. The second sensor or sensor system measures a pressure, a temperature, a speed of sound, and/or a velocity of the fluid at a corresponding location along the pipe, and provides signals indicative of the pressure, the temperature, the speed of sound, and the velocity of the fluid at the axial location of the second sensor. A multi-phase flow model responsive to the signals provides a signal indicative of the flow rate of the multi-phase fluid.

The present invention further provides a method of measuring the flow rate of a multiphase fluid in a pipe. The method comprises measuring a pressure, a temperature, a speed of sound, and a velocity of the fluid at a location along the pipe,. and providing signals indicative of the pressure, the temperature, the speed of sound, and the velocity of the fluid. The flow rate of the multi-phase fluid is calculated based on the signals. Still further, the present invention provides a method wherein the measuring step comprises measuring a pressure, a temperature, a speed of sound, and a velocity of the fluid at a plurality of locations along the pipe.

The foregoing and other objects, features and advantages of the present invention will become more apparent in light of the following detailed description of exemplary embodiments thereof.

BEST MODE FOR CARRYING OUT THE INVENTION

Figure 1:
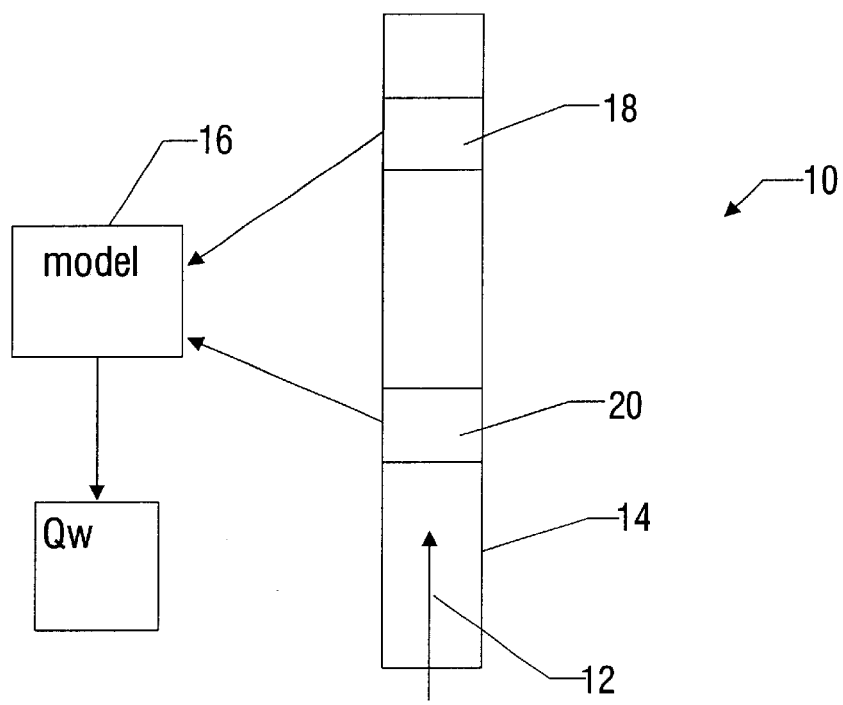
FIG. 1 is a schematic diagram of a prior art multiphase flow meter.

Referring to FIG. 1 there is shown a prior art MPFM 10 for monitoring flow rates of a multi-phase fluid represented by arrow 12 flowing within a pipe 14. Math model 16 of MPFM 10 utilizes output from sensor 18 and at least sensor 20 to predict the phase fraction flow rate of fluid 12. Sensors 18, 20 are typical prior art sensors described above that provide parameters to the model 16 such as temperature, pressure, and phase fraction. Model 16 utilizes the output of sensors 18, 20 to determine, among other things, axial momentum and radial heat transfer of the fluid 12. The axial momentum and radial heat transfer are calibrated to phase fraction volumetric flow rates at known conditions to provide an estimate of the global multi-phase flow rate Qw.

Figure 2:
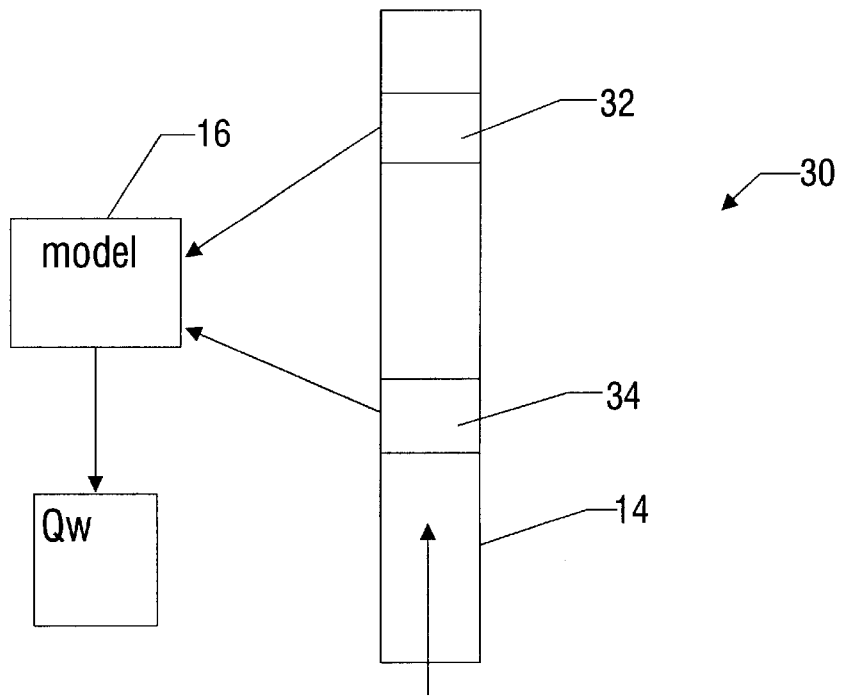
FIG. 2 is a schematic diagram of a single zone multiphase flow meter in accordance with the present invention.

Referring to FIG. 2 there is shown a MPFM 30 of the present invention, which utilizes sensor 32 and sensor 34. Sensor 32 and sensor 34 may comprise a single sensor or a sensor system comprising multiple sensors or sensor arrays. Sensors 32 and 34, which include fiber optic or electronically passive sensors, provide temperature, pressure, sound speed measurements and/or bulk velocity measurements of a multi-phase fluid 12 to system model 16. Model 16 utilizes the speed of sound and/or bulk velocity information to provide a robust and accurate multi-phase flow rate Qw to monitor multiphase flow production as will be described more fully below. Because the disclosed techniques preferably employ a determination of the speed of sound in the fluid mixture in the pipe, and/or its bulk velocity, sensor systems for determining these parameters are disclosed in detail in the following sections.

I. SOUND SPEED MEASUREMENTS

A. Basic Considerations

To provide fluid sound speed measurements to model 16, the present invention utilizes acoustic sensors 32, 34 and methods such as those described in commonly assigned U.S. Pat. No. 6,354,147, entitled "Fluid Parameter Measurement in Pipes Using Acoustic Pressure," the disclosure of which is incorporated herein by reference in its entirety and is discussed in detail below. As described, the sensors provide sound speed measurements to model 16 by measuring acoustic pressure waves in the fluid 12. The invention preferably uses acoustic signals having lower frequencies (and thus longer wavelengths) than those used for ultrasonic meters, such as below about 20 kHz (depending on pipe diameter). As such, the invention is more tolerant to the introduction of gas, sand, slugs, or other inhomogeneities in the flow. As one skilled in the art would realize, the embodiment described below may also be referred to as a phase fraction meter or a sound speed meter.

Figure 3:
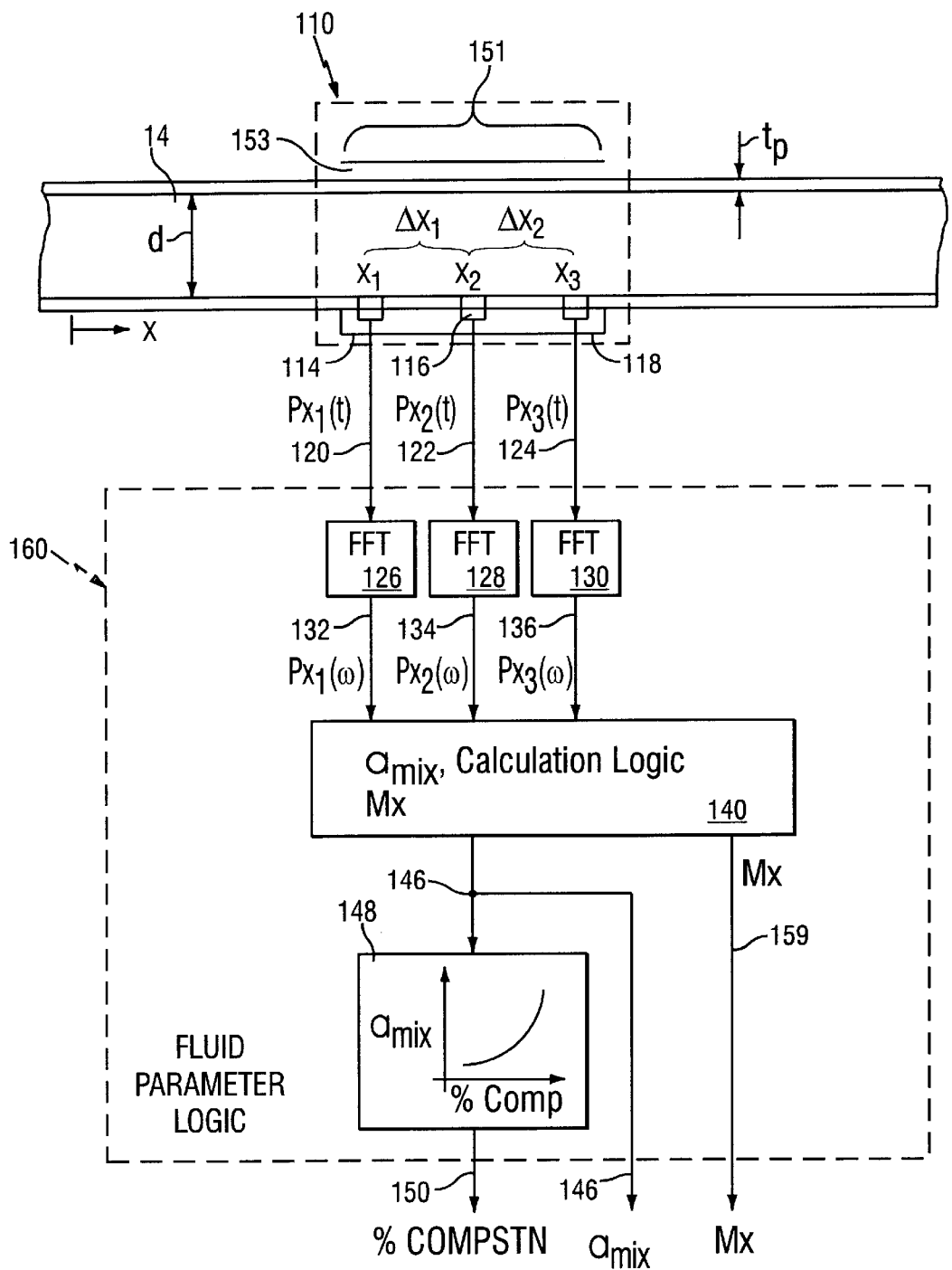
FIG. 3 is a schematic block diagram of a sound speed measurement system, in accordance with one aspect of the present invention.

FIG. 3 discloses a speed of sound meter that could be used for either of the sensors 32 or 34 in FIG. 2. Referring to FIG. 3, the pipe, or conduit, 14 has three unsteady pressure sensors 114, 116, 118, located at three locations $X_1$, $X_2$, $X_3$ along the pipe 14. The sensors 114, 116, 118 provide pressure time-varying signals $P_1(t)$, $P_2(t)$, $P_3(t)$ on lines 120, 122, 124, to known Fast Fourier Transform (FFT) logics 126, 128, 130, respectively. The FFT logics 126, 128, 130 calculate the Fourier transform of the time-based input signals $P_1(t)$, $P_2(t)$, $P_3(t)$ and provide complex frequency domain (or frequency based) signals $P_1(\omega)$, $P_2(\omega)$, $P_3(\omega)$ on lines 132, 134, 136 indicative of the frequency content of the input signals. Instead of FFTs, any other technique for obtaining the frequency domain characteristics of the signals $P_1(t)$, $P_2(t)$, $P_3(t)$, may be used. For example, the cross-spectral density and the power spectral density may be used to form frequency domain transfer functions (or frequency responses or ratios) discussed below.

The frequency signals $P_1(\omega)$, $P_2(\omega)$, $P_3(\omega)$ are fed to an $\alpha_{mix}$-Mx Calculation Logic 140 which provides a signal on a line 146 indicative of the speed of sound of the mixture $\alpha_{mix}$. The $\alpha_{mix}$ signal is provided to map (or equation) logic 148, which converts $\alpha_{mix}$ to a percent composition of the fluid and provides a "% Comp" signal on line 150. Also, if the Mach number, Mx, is not negligible and is desired to be known, the calculation logic 140 may also provide a signal Mx on a line 159 indicative of the Mach number (as discussed hereinafter).

For planar one-dimensional acoustic waves in a homogenous mixture, it is known that the acoustic pressure field $P(x,t)$ at a location x along a pipe, where the wavelength $\lambda$ of the acoustic waves to be measured is long compared to the diameter d of the pipe 14 (i.e., $\lambda/d >> 1$), may be expressed as a superposition of a right traveling wave and a left traveling wave, as follows:

$$P(x,t)=(Ae^{-ik_r x}+Be^{+ik_l x})e^{i\omega t} \quad \text{Eq. 1}$$

where A and B are the frequency-based complex amplitudes of the right and left traveling waves, respectively, x is the pressure measurement location along a pipe, co is frequency (in rad/sec, where ($\omega=2\pi f$), and $k_r$, $k_l$ are wave numbers for the right and left travelling waves, respectively, which are defined as:

$$k_r \equiv \left(\frac{\omega}{a_{mix}}\right)\frac{1}{1+M_x} \text{ and } k_l \equiv \left(\frac{\omega}{a_{mix}}\right)\frac{1}{1-M_x} \quad \text{Eq. 2}$$

where $\alpha_{mix}$ is the speed of sound in the mixture in the pipe, (o is frequency (in rad/sec), and $M_x$ is the axial Mach number of the flow of the mixture within the pipe, where:

$$M_x \equiv \frac{V_{mix}}{a_{mix}} \quad \text{Eq. 3}$$

where $V_{mix}$ is the axial velocity of the mixture. For non-homogenous mixtures, the axial Mach number represents the average velocity of the mixture and the low frequency acoustic field description remains substantially unaltered.

The frequency domain representation $P(x,\omega)$ of the time-based acoustic pressure field $P(x,t)$ within a pipe, is the coefficient of the $e^{i\omega t}$ term of Eq. 1:

$$P(x, \omega) = Ae^{-ik_r x} + Be^{+ik_l x} \qquad \text{Eq. 4}$$

Referring to FIG. 3, it has been determined that using Eq. 4 at three axially distributed pressure measurement locations $x_1$, $x_2$, $x_3$ along the pipe 14 leads to an equation for $\alpha_{mix}$ as a function of the ratio of frequency based pressure measurements, which allows the coefficients A and B to be eliminated. For optimal results, A and B are substantially constant over the measurement time and substantially no sound (or acoustic energy) is created or destroyed in the measurement section. The acoustic excitation enters the test section only through the ends of the test section 151 and, thus, the speed of sound within the test section 151 can be measured independent of the acoustic environment outside of the test section. In particular, the frequency domain pressure measurements $P_1(\omega)$, $P_2(\omega)$, $P_3(\omega)$ at the three locations $x_1$, $x_2$, $x_3$, respectively, along the pipe 14 using Eq. 1 for right and left traveling waves are as follows:

$$P_1(\omega) = P(x=x_1,\omega) = Ae^{-ik_r x_1} + Be^{+ik_l x_1} \qquad \text{Eq. 5}$$

$$P_2(\omega) = P(x=x_2,\omega) = Ae^{-ik_r x_2} + Be^{+ik_l x_2} \qquad \text{Eq. 6}$$

$$P_3(\omega) = P(x=x_3,\omega) = Ae^{-ik_r x_3} + Be^{+ik_l x_3} \qquad \text{Eq. 7}$$

where, for a given frequency, A and B are arbitrary constants describing the acoustic field between the sensors 114, 116, 118. Forming the ratio of $P_1(\omega)/P_2(\omega)$ from Eqs. 6 and 7, and solving for B/A, gives the following expression:

$$R \equiv \frac{B}{A} = \frac{e^{-ik_r x_1} - \left[\frac{P_1(\omega)}{P_2(\omega)}\right]e^{-ik_r x_2}}{\left[\frac{P_1(\omega)}{P_2(\omega)}\right]e^{ik_l x_2} - e^{ik_l x_1}} \qquad \text{Eq. 8}$$

where R is defined as the reflection coefficient.

Forming the ratio of $P_1(\omega)/P_3(\omega)$ from Eqs. 5 and 7 and solving for zero gives:

$$\frac{e^{ik_r x_1} + Re^{ik_l x_1}}{e^{ik_r x_3} + Re^{ik_l x_3}} - \left[\frac{P_1(\omega)}{P_3(\omega)}\right] = 0 \qquad \text{Eq. 9}$$

where R=B/A (Eq. 8) and $k_r$ and $k_l$ are related to $\alpha_{mix}$ (Eq. 2). Eq. 9 may be solved numerically, for example, by defining an "error" or residual term as the magnitude of the left side of Eq. 9, and iterating to minimize the error term.

$$mag\left[\frac{e^{ik_r x_1} + Re^{ik_l x_1}}{e^{-ik_r x_3} + Re^{ik_l x_3}} - \left[\frac{P_1(\omega)}{P_3(\omega)}\right]\right] \equiv Error \qquad \text{Eq. 10}$$

By implementing various equations above, the speed of sound in the fluid may be computed by either: (1) varying $\alpha_{mix}$ while minimizing an error term, (2) calculating a logarithmic relationship between the acoustic pressure variation signals, or (3) calculating a trigonometric relationship between the acoustic pressure variation signals.

B. Determining Speed Of Sound ($\alpha_{mix}$) By Minimizing An Error Term

For many applications in the oil industry, the axial velocity of the flow in the pipe is small compared to the speed of sound in the mixture (i.e., the axial Mach number $M_x$ is small compared to one). For example, the axial velocity of the oil $V_{oil}$ in a typical oil well is about 10 ft/sec and the speed of sound in oil $\alpha_{oil}$ is about 4,000 ft/sec. Thus, the Mach number Mx of a pure oil mixture is 0.0025 ($V_{oil}/\alpha_{oil}$= 10/4,000), and Eq. 2 reduces to approximately:

$$k_r = k_l = \frac{\omega}{\alpha_{mix}} \qquad \text{Eq. 11}$$

and the distinction between the wave numbers for the right and left traveling waves are eliminated. In that case (where Mx is negligible), because all of the variables in Eq. 10 are known except for $\alpha_{mix}$ the value for $\alpha_{mix}$ can be iteratively determined by evaluating the error term at a given frequency ω) and varying $\alpha_{mix}$ until the error term goes to zero. The value of $\alpha_{mix}$ at which the magnitude of the error term equals zero (or is a minimum), corresponds to the correct value of the speed of sound in the mixture $\alpha_{mix}$. As Eq. 10 is a function of frequency ω, the speed of sound $\alpha_{mix}$ at which the error goes to zero is the same for each frequency ω evaluated. Furthermore, since each frequency is an independent measurement of the same parameter, the multiple measurements may be weighted, averaged or filtered to provide a single more robust measurement of the speed of sound in the fluid.

Figure 4:
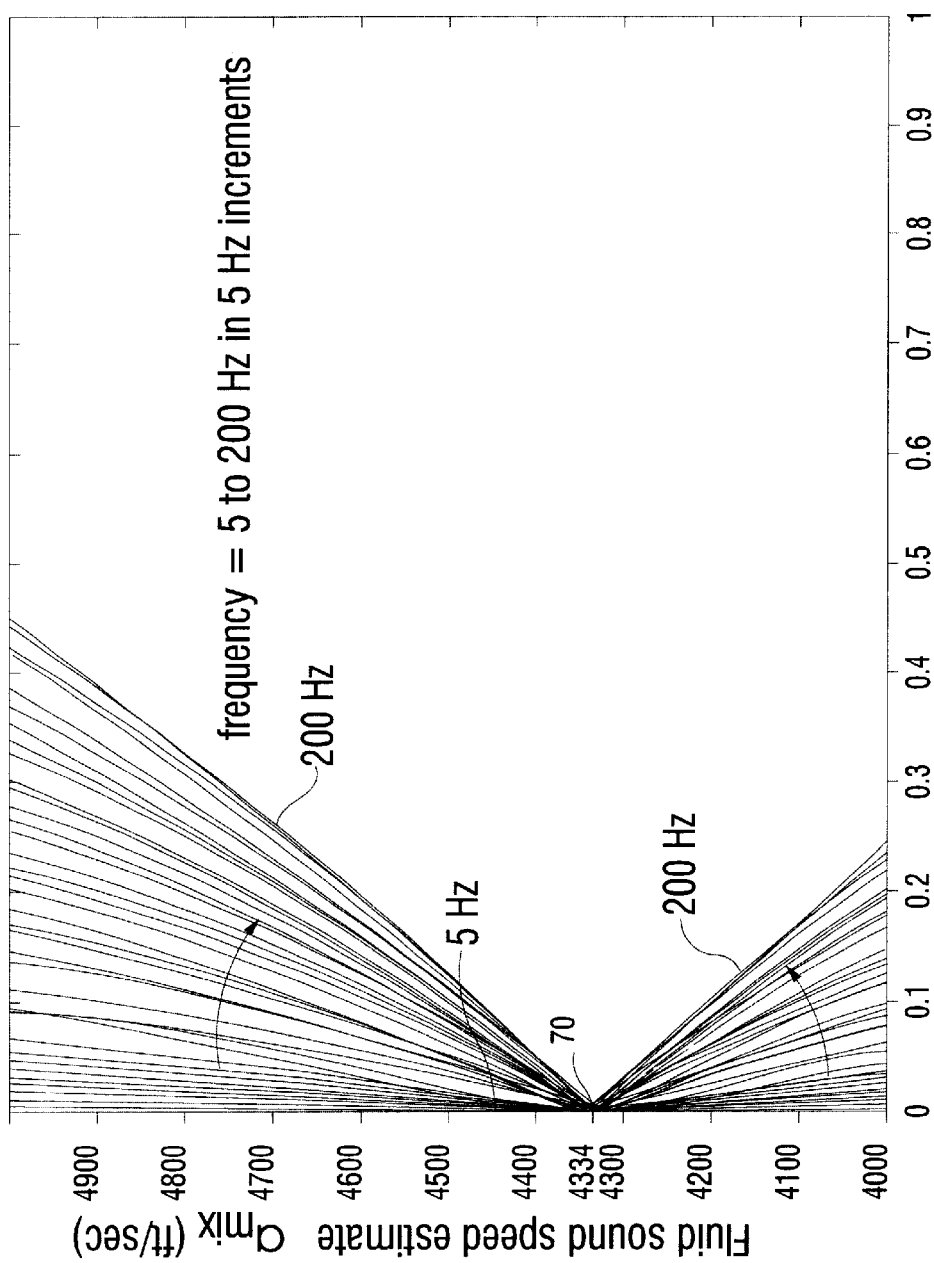
FIG. 4 is a graph of the magnitude of the fluid sound speed estimate versus an error term over a range of frequencies, in accordance with one aspect of the present invention.

Referring to FIG. 4, the error term of Eq. 10 constitutes a family of curves, one curve for each frequency ω, where the value of the error is evaluated for values of $\alpha_{mix}$ varied from $\alpha_{water}$ (5,000 ft/sec) to $\alpha_{oil}$ (4,000 ft/sec) at each frequency varied from 5 to 200 Hz in 5 Hz increments. Other frequencies may be used if desired. The speed of sound $\alpha_{mix}$ where the error goes to zero (or is minimized) is the same for each frequency ω evaluated. In this case, the error is minimized at a point 170 when $\alpha_{mix}$ is 4335 ft/sec.

C. Determining Speed Of Sound ($\alpha_{mix}$) Using A Logarithmic Relationship

If the pressure sensors are equally spaced (i.e., $x_1-x_2 = x_3-x_2 = \Delta x$; or $\Delta x_1 = \Delta x_2 = \Delta x$) and if the axial Mach number Mx is small compared to one (and thus, $k_r = k_l = k$), Eq. 10 may be solved for k (and thus $\alpha_{mix}$) in a closed-form solution as a function of the pressure frequency responses (or frequency based signal ratios) as follows:

$$k = \frac{\omega}{\alpha_{mix}} = \left[\frac{1}{\Delta x}\right] i \log\left[\frac{P_{12} + P_{13}P_{12} + (P_{12}^2 + 2P_{13}P_{12}^2 + P_{13}^2 P_{12}^2 - 4P_{13}^2)^{1/2}}{2P_{13}}\right] \qquad \text{Eq. 12}$$

Solving for $\alpha_{mix}$, gives:

$$\alpha_{mix} = \frac{\omega}{\left[\frac{1}{\Delta x}\right] i \log\left[\frac{P_{12} + P_{13}P_{12} + (P_{12}^2 + 2P_{13}P_{12}^2 + P_{13}^2 P_{12}^2 - 4P_{13}^2)^{1/2}}{2P_{13}}\right]} \qquad \text{Eq. 13}$$

where $P_{12}=P_1(\omega)/P_2(\omega)$, $P_{13}=P_1(\omega)/P3(\omega)$, i is the square root of 1. Because the result of the Log function is also an imaginary number, a real number for the speed of sound $\alpha_{mix}$ is yielded.

The analytical solution to Eq. 10 as reflected in Eqs. 12 and 13 is valid primarily for the frequencies for which the length of the test section 151 along the pipe 14 (i.e., $X_3-x_1$ or $2\Delta x$ for equally spaced sensors) is shorter than the wavelength $\lambda$ of the acoustic waves to be measured. This restriction results because of the multiple possible solutions for Eq. 10. Alternative solutions to Eq. 10 for other frequency ranges may be derived using a variety of known techniques.

D. Determining Speed Of Sound ($\alpha_{mix}$) Using A Trigonometric Relationship An alternative closed form solution for $\alpha_{mix}$ (in a trigonometric form) from the three pressure equations 5–7, where the pressure sensors are equally spaced and Mx is negligible (i.e., $k_r=k_l$), can be calculated from the following equation:

$$\frac{P_1(\omega)+P_3(\omega)}{P_2(\omega)} = 2\cos(k\Delta x) = 2\cos\left(\frac{\omega \Delta x}{a_{mix}}\right) \quad \text{Eq. 14}$$

Eq. 14 is particularly useful due to its simple geometric form, from which $\alpha_{mix}$ can be easily interpreted. In particular, $\alpha_{mix}$ can be determined directly by inspection from a digital signal analyzer (or other similar instrument) set up to provide a display indicative of the left side of Eq. 14, which will be a cosine curve from which $\alpha_{mix}$ may be readily obtained. For example, at the zero crossing of the cosine wave, $\alpha_{mix}$ will be equal to $2\omega\Delta X/\pi$. Alternatively, Eq. 14 may be used to determine $\alpha_{mix}$ using an iterative approach where a measured function is calculated from the left side of Eq. 14 (using the measured pressures), which is compared to a cosine curve of the right side of Eq. 14, where $\alpha_{mix}$ is varied until it substantially matches the measured function. Various other curve fitting, parameter identification, and/or minimum error or solution techniques may be used to determine the value of $\alpha_{mix}$ that provides the best fit to satisfy Eq. 14.

Solving Eq. 14 for $\alpha_{mix}$, gives the following closed-form solution:

$$a_{mix} = \frac{\omega \Delta x}{\cos^{-1}\left(\frac{P_1(\omega)+P_3(\omega)}{2P_2(\omega)}\right)} = \frac{\omega \Delta x}{\cos^{-1}\frac{1}{2}\left(\frac{P_1(\omega)}{P_2(\omega)}+\frac{P_3(\omega)}{P_2(\omega)}\right)} \quad \text{Eq. 15}$$

E. Fluid Sound Speed Calculation Logic

Figure 5:
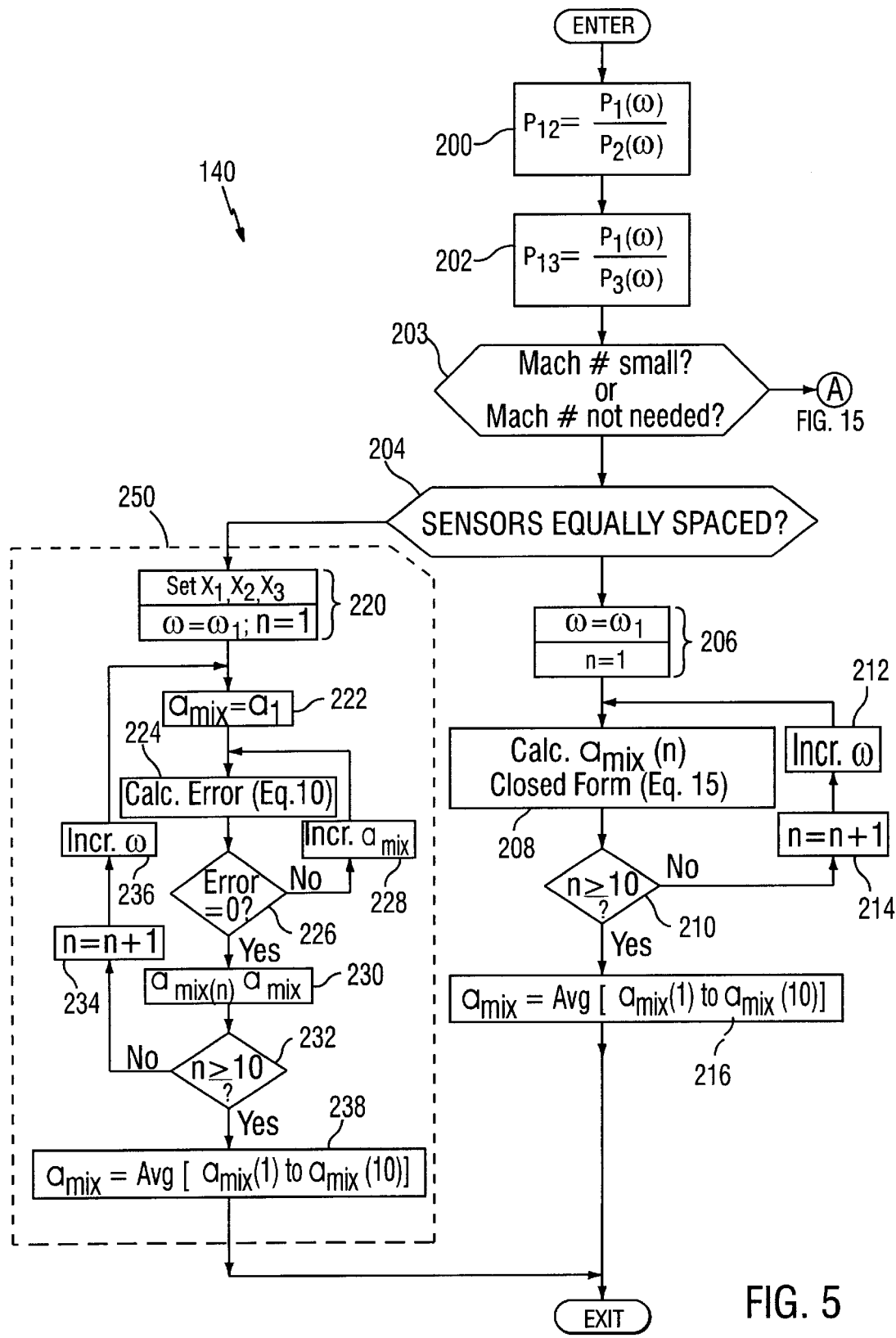
FIG. 5 is a portion of a logic flow diagram for measuring fluid sound speed, in accordance with one aspect of the present invention.

Referring to FIG. 5, the calculation logic 140 (see FIG. 3) begins at step 200 where $P_{12}$ is calculated as the ratio of $P_1(\omega)/P_2(\omega)$, and at step 202 where $P_{13}$ is calculated as the ratio of $P_1(\omega)/P_3(\omega)$. Next, step 203 determines whether the Mach number Mx of the mixture is negligible (or whether it is desirable to calculate Mx, i.e. for cases where Mx is not negligible, as set forth below with reference to "A" and FIG. 15). If Mx is negligible, step 204 determines if the sensors 114, 116, 118 are equally spaced (i.e., $x_1\_x_2=x_2\_x_3\_\Delta x$). Assuming equally spaced sensors, step 206 sets initial values for $\omega=\omega 1$ (e.g., 100 Hz) and a counter n=1. Next, step 208 calculates $\alpha_{mix}(n)$ from the closed form solution of Eq. 13. Then, step 210 checks whether the logic 140 has calculated $\alpha_{mix}$ at a predetermined number of frequencies, e.g., 10. If n is not greater than 10, steps 212 and 214 increment the counter n by one and increases the frequency $\omega$ by a predetermined amount (e.g., 10 Hz) and step 208 is repeated. If the logic 140 has calculated $\alpha_{mix}$ at 10 frequencies, logic 140 goes to step 216, which determines an average value for $\alpha_{mix}$ using the values of $\alpha_{mix}(n)$ over the 10 frequencies, and the logic 140 then exits.

If the sensors are not equally spaced, a series of steps 250 are performed starting with step 220, which sets $x_1$, $x_2$, and $x_3$ to the current pressure sensor spacing, and sets initial values for $\omega=\omega 1$ (e.g., 100 Hz) and the counter n=1. Next, step 222 sets $\alpha_{mix}=\alpha_{mix-min}$ (e.g., $\alpha_{oil}=4000$ ft/sec) and step 224 calculates the error term from Eq. 10. Then, step 226 checks whether error =0. If the error does not equal zero, $\alpha_{mix}$ is incremented by a predetermined amount and the logic 140 goes to step 224.

Figure 15:
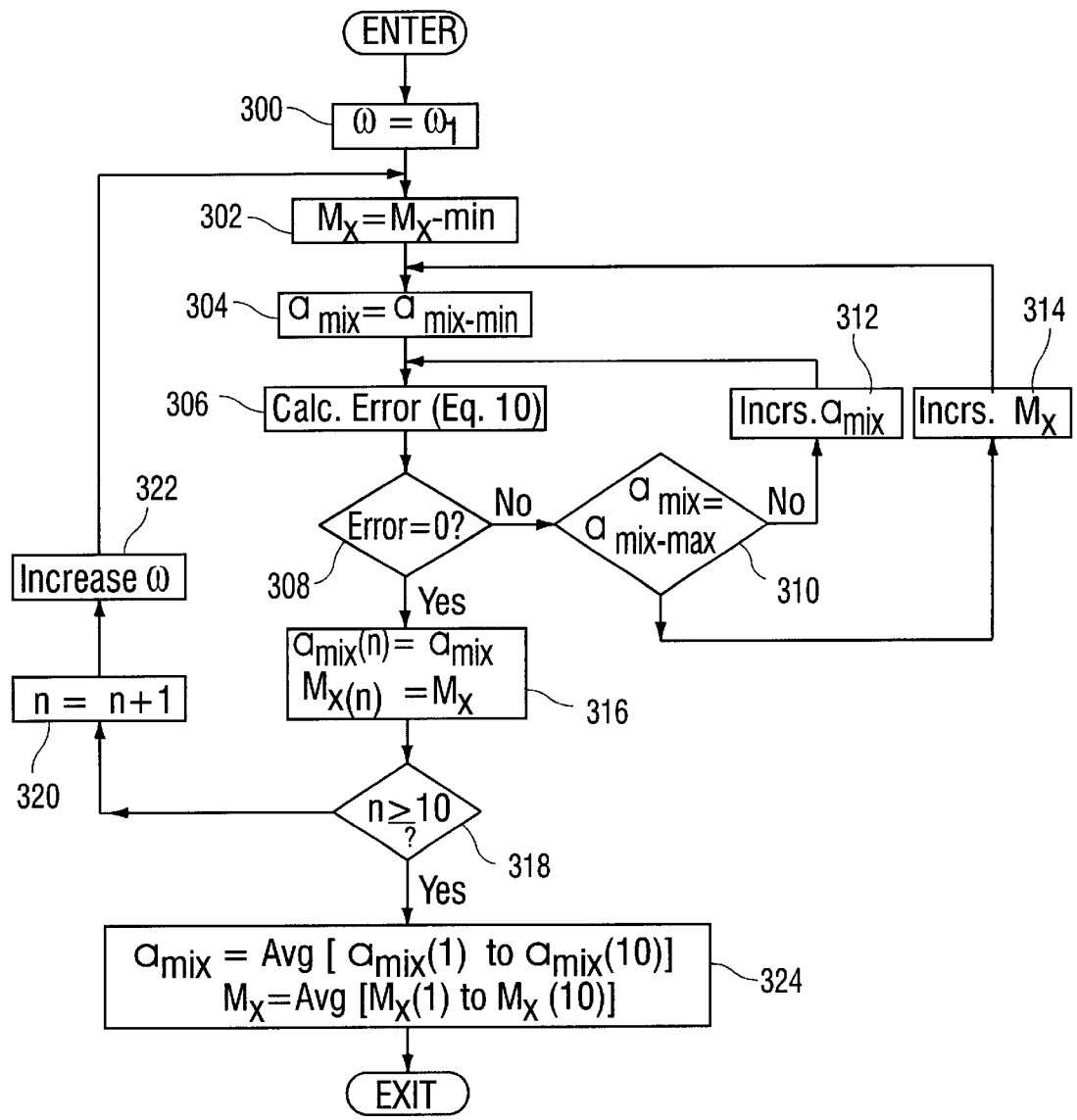
FIG. 15 is a continuation of the logic flow diagram of FIG. 5 for measuring fluid sound speed, in accordance with one aspect of the present invention.

If the error=0 (or a minimum) in step 226, step 230 sets $\alpha_{mix}(n)=\alpha_{mix}$. Next, step 232 checks whether n is greater than or equal to 10. If not, step 234 increments n by one and step 236 increases the frequency $\omega$ by a predetermined amount (e.g., 10 Hz) and continues at step 222 as shown in FIG. 15. If n is greater than or equal to 10, step 238 calculates an average value for $\alpha_{mix}$ over the 10 frequencies, and the logic 140 ends.

Referring to FIG. 15, if the Mach number Mx is not negligible, several steps 300, 302, 304 set initial conditions: $\omega=\omega 1$ (e.g., 100 Hz); Mx=Mx-min (e.g., 0); $\alpha_{mix}=\alpha_{mix-min}$ (e.g., $\alpha_{oil}=4000$ ft/sec). Then, step 306 calculates the error term of Eq. 10. Next, step 308 checks whether the error=0 (or a minimum). If not, step 310 checks whether $\alpha_{mix}=\alpha_{mix-max}$(e.g., $\alpha_{water}=5000$ ft/sec). If not, step 312 increases $\alpha_{mix}$ by a predetermined amount (e.g., 1 ft/sec) and the logic goes back to step 306. If the result of step 310 is yes, step 314 increases Mx by a predetermined amount (e.g., 1 ) and the logic goes back to step 304.

When step 308 indicates error=0 (or a minimum), step 316 sets $\alpha_{mix}(n)=\alpha_{mix}$ and Mx(n)=Mx, and step 318 checks whether the values of $\alpha_{mix}$ and Mx have been calculated at 10 different frequencies. If not, step 320 increments the counter n by one and step 322 increases the value of the frequency $\omega$ by a predetermined amount (e.g., 10 Hz), and the logic goes back to step 302. If the values of $\alpha_{mix}$ and Mx have been calculated at 10 different frequencies (i.e., n is equal to 10), step 324 calculates average values for $\alpha_{mix}(n)$ and Mx(n) at the 10 different frequencies to calculate $\alpha_{mix}$ and Mx, and the logic exists.

F. Fiber Optic Embodiments

Figure 6:
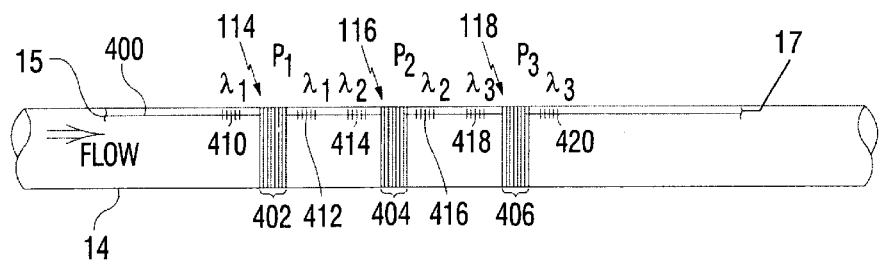
FIG. 6 is a side view of a pipe having optical fiber wrapped around the pipe at each measurement location separated by a pair of Bragg gratings, in accordance with one aspect of the present invention.

Referring to FIG. 6, for embodiments of the present invention utilizing fiber optic sensors with the wraps 402, 404, 406 connected in series, pairs of Bragg gratings (410, 412 ), (414, 416 ), (418, 420 ) may be located along the fiber 400 at opposite ends of each of the wraps 402, 404, 406, respectively. The grating pairs are used to multiplex the pressure signals $P_1$, $P_2$, $P_3$ to identify the individual wraps from optical return signals. The first pair of gratings 410, 412 around the wrap 402 may have a common reflection wavelength $\lambda_1$, and the second pair of gratings 414, 416 around the wrap 404 may have a common reflection wavelength $\lambda_2$, but different from that of the first pair of gratings 410, 412. Similarly, the third pair of gratings 418, 420 around the wrap 406 have a common reflection wavelength $\lambda_3$, which is different from $\lambda_1$ and $\lambda_2$. The fiber 400 may continue to other sensors as shown by reference numeral 17 or return the optical signals to the instrument as shown by reference numeral 15.

Figure 7:
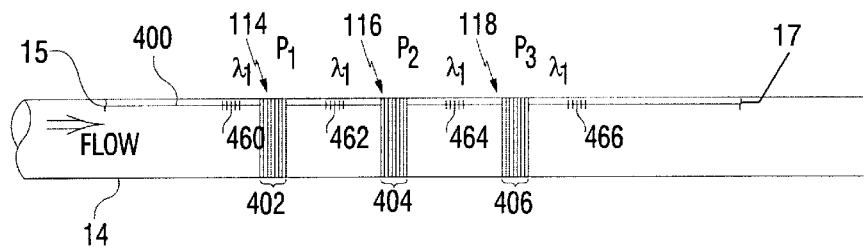
FIG. 7 is a side view of a pipe having optical fiber wrapped around the pipe at each measurement location with a single Bragg grating between each pair of optical wraps, in accordance with one aspect of the present invention.

Referring to FIG. 7, instead of having a different pair of reflection wavelengths associated with each wrap, a series of Bragg gratings 460, 462, 464, 466 with only one grating between each of the wraps 402, 404, 406 may be used, each having a common reflection wavelength $\lambda_1$.

Referring to FIGS. 6 and 7, the wraps 402, 404, 406 with the gratings 410, 412, 414, 416, 418, 420 (FIG. 22) or with the gratings 460, 462, 464, 466 (FIG. 7) may be configured in numerous known ways to precisely measure the fiber length or change in fiber length, such as by interferometric, Fabry Perot, time-of-flight, or other known arrangements. One example of time-of-flight (or Time-Division-Multiplexing; TDM) would be where an optical pulse having a wavelength is launched down the fiber 400 and a series of optical pulses are reflected back along the fiber 400. The length of each wrap can then be determined by the time delay between each return pulse.

While the gratings are shown oriented axially with respect to pipe 14 in FIGS. 6 and 7, the gratings may be oriented along the pipe 14 axially, circumferentially, or in any other orientations. Depending on the orientation, the grating may measure deformations in the pipe wall with varying levels of sensitivity. If the grating reflection wavelength varies with internal pressure changes, such variation may be desired for certain configurations (e.g., fiber lasers) or may be compensated for in the optical instrumentation for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 400.

Figure 8:
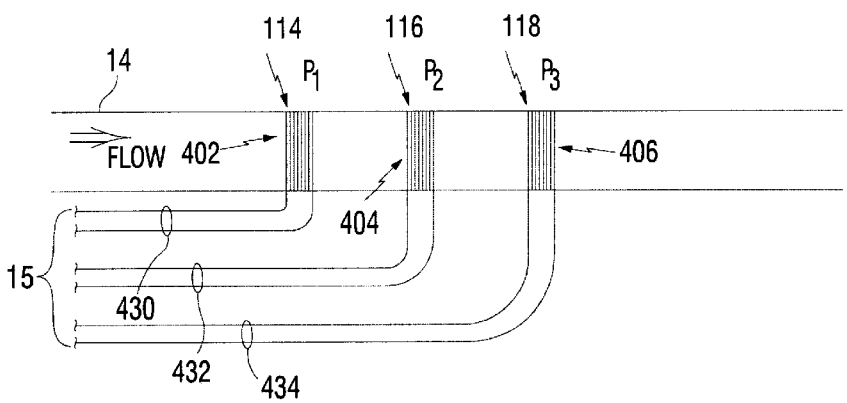
FIG. 8 is a side view of a pipe having optical fiber wrapped around the pipe at each measurement location without Bragg gratings, in accordance with one aspect of the present invention.

Referring to FIG. 8, alternatively, the sensors 114, 116, 118 may also be formed as a purely interferometric sensor by wrapping the pipe 14 with the wraps 402, 404, 406 without using Bragg gratings, in which case separate fibers 430, 432, 434 may be fed to the separate, corresponding wraps 402, 404, 406. In this particular embodiment, known interferometric techniques may be used to determine the length or change in length of the fiber wraps 402, 404, 406 around the pipe 14 due to pressure changes within the pipe. These known interferometric techniques include the Mach Zehnder or Michaelson Interferometric techniques that are described in U.S. Pat. No. 5,218,197, entitled "Method And Apparatus For The Non-Invasive Measurement Of Pressure Inside Pipes Using A Fiber Optic Interferometer Sensor," to Carroll. The inteferometric wraps may also be multiplexed as described in Dandridge, et al., "Fiber Optic Sensors for Navy Applications," IEEE, Feb. 1991, or Dandridge, et al., "Multiplexed Intereferometric Fiber Sensor Arrays," SPIE, Vol. 1586, 1991, pp. 176–183. Other techniques to determine the change in fiber length may also be used. Also, reference optical coils (not shown) may be used for certain interferometric approaches and may also be located on or around the pipe 14 but may be designed to be insensitive to pressure variations.

Figure 9:
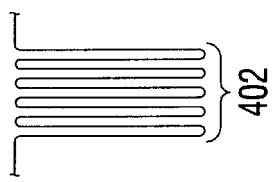
FIG. 9 is an alternative geometry of an optical wrap of a radiator tube geometry, in accordance with one aspect of the present invention.
Figure 10:
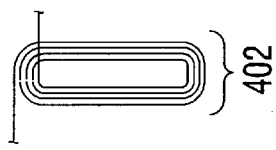
FIG. 10 is an alternative geometry of an optical wrap of a race track geometry, in accordance with one aspect of the present invention.

Referring to FIGS. 9 and 10, instead of the wraps 402, 404, 406 being optical fiber coils wrapped completely around the pipe 14, the wraps 402, 404, 406 may have alternative geometries, such as a "radiator coil" geometry, as shown in FIG. 9, or a "race-track" geometry, as shown in FIG. 10. Both of these alternative geometries are shown in a side view as if the pipe 14 is cut axially and laid flat. In this particular embodiment, the wraps 402, 404, 406 are not necessarily wrapped 360 degrees around the pipe, but may be disposed over a predetermined portion of the circumference of the pipe 14 with a length long enough to optically detect the changes to the pipe circumference. Other geometries for the wraps may be used if desired. Also, for any geometry of the wraps described, more than one layer of fiber may be used depending on the overall fiber length desired. The desired axial length of any particular wrap is set depending on the characteristics of the ac pressure desired to be measured, for example the axial length of the pressure disturbance caused by a vortex to be measured.

Figure 11:
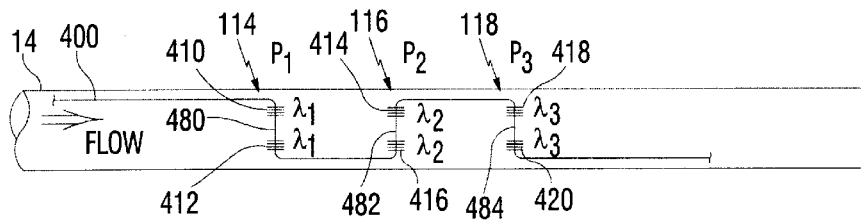
FIG. 11 is a side view of a pipe having a pair of gratings at each axial sensing location, in accordance with one aspect of the present invention.
Figure 12:
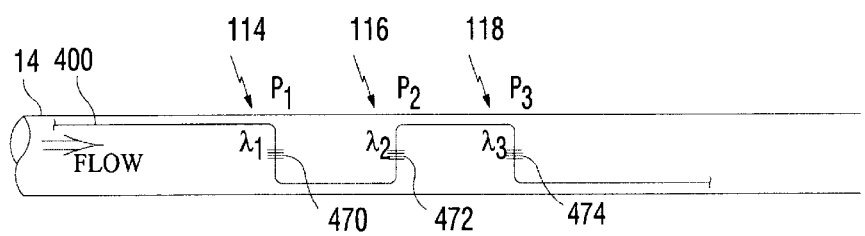
FIG. 12 is a side view of a pipe having a single grating at each axial sensing location, in accordance with one aspect of the present invention.

Referring to FIGS. 11 and 12, embodiments of the present invention include configurations wherein instead of using the wraps 402, 404, 406, the fiber 400 may have shorter sections that are disposed around at least a portion of the circumference of the pipe 14 that can optically detect changes to the pipe circumference. It is further within the scope of the present invention that sensors may comprise an optical fiber 400 disposed in a helical pattern (not shown) about pipe 14. As discussed above, the orientation of the strain sensing element will vary the sensitivity to deflections in pipe wall deformations caused by unsteady pressure signals in the pipe 14.

Figure 13:
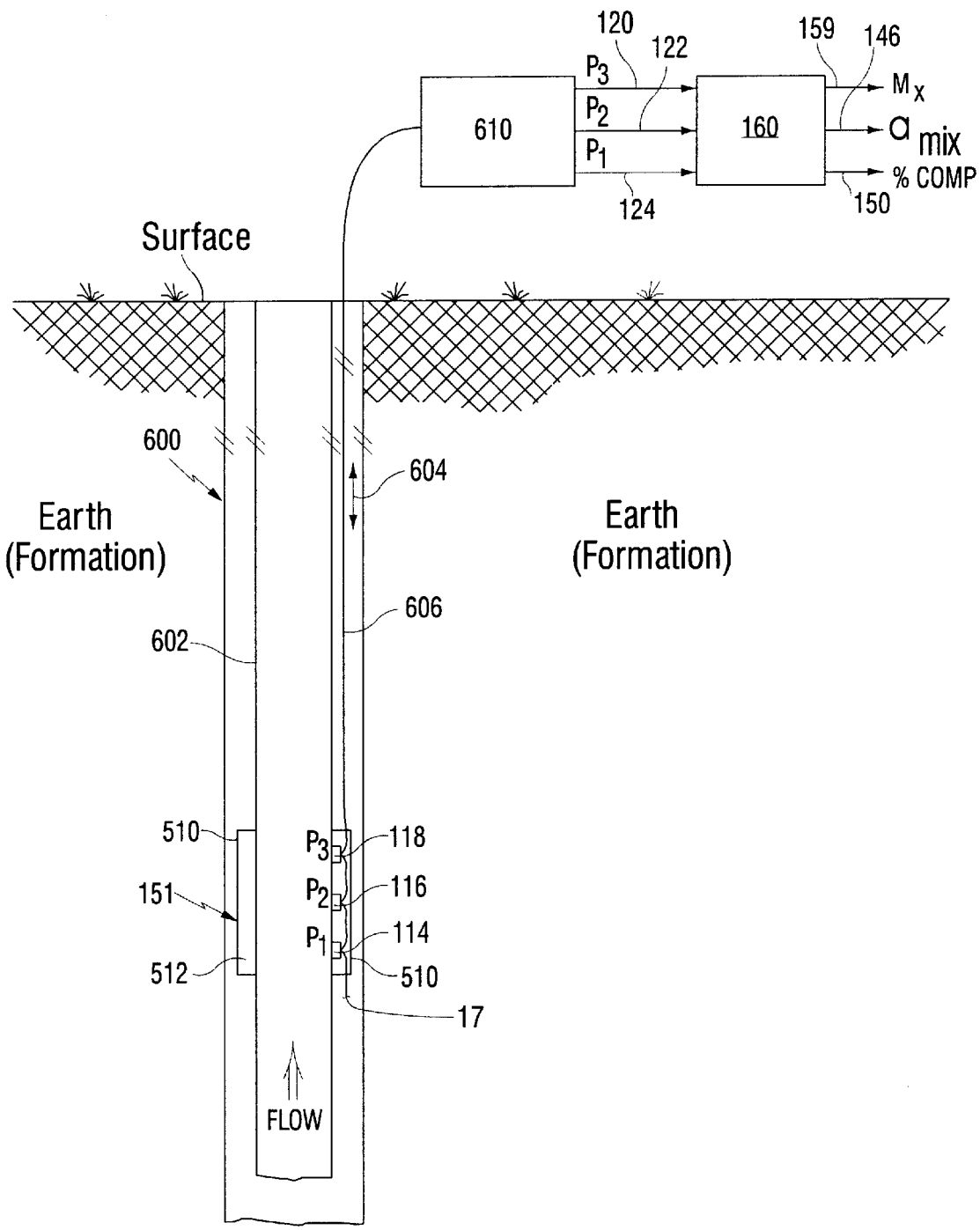
FIG. 13 is a schematic block diagram of a sound speed measurement system in an oil or gas well application, using fiber optic sensors, in accordance with one aspect of the present invention.

FIG. 13 illustrates an embodiment of a sound speed measurement system in an oil or gas well application. The sensing section 151 may be connected to or part of the production tubing 602 (analogous to the pipe 14 in the test section 151) within a well 600. An isolation sleeve 510 may be located over the sensors 114, 116, 118 and attached to the pipe 602 at its axial ends to protect the sensors 114, 116, 118 (or fibers) from damage during deployment, use, or retrieval. The isolation sleeve may also help isolate the sensors 114, 116, 118 from acoustic external pressure effects that may exist outside the pipe 602, and/or to help isolate ac pressures in the pipe 602 from ac pressures outside the pipe 602. The sensors 114, 116, 118 are connected to a cable 606 which may comprise an optical fiber 400 and is connected to a transceiver/converter 610 located outside the well 600.

When optical sensors are used, the transceiver/converter 610 may be used to receive and transmit optical signals 604 to the sensors 114, 116, 118 and provides output signals indicative of the pressure $P_1$, $P_2$, $P_3$ at the sensors 114, 116, 118 on the lines 120, 122, 124, respectively. Also, the transceiver/converter 610 may be part of the Fluid Parameter Logic 160. The transceiver/converter 610 may be any device that performs the corresponding functions described. In particular, the transceiver/converter 610 together with the optical sensors described hereinbefore may use any type of optical grating-based measurement technique, e.g., scanning interferometric, scanning Fabry Perot, acousto-optic-tuned filter (AOTF), optical filter, time-of-flight, and may use WDM and/or TDM, etc., having sufficient sensitivity to measure the ac pressures within the pipe, such as that described in one or more of the following references: A. Kersey et al., "Multiplexed fiber Bragg grating strain-sensor system with a Fabry-Perot wavelength filter," Opt. Letters, Vol. 18, No. 16, Aug. 1993; U.S. Pat. No. 5,493,390, issued Feb. 20, 1996, to Mauro Verasi, et al.; U.S. Pat. No. 5,317,576, issued May 31, 1994, to Ball et al.; U.S. Pat. No. 5,564,832, issued Oct. 15, 1996, to Ball et al.; U.S. Pat. No. 5,513,913, issued May 7, 1996 to Ball et al.; U.S. Pat. No. 5,426,297, issued Jun. 20, 1995, to Dunphy et al.; U.S. Pat. No. 5,401,956, issued Mar. 28, 1995, to Dunphy et al.; U.S. Pat. No. 4,950,883, issued Aug. 21, 1990, to Glenn; and U.S. Pat. No. 4,996,419, issued Feb. 26, 1991 to Morey, all of which are incorporated by reference. Also, the pressure sensors described may operate using one or more of the techniques described in the aforementioned references.

G. Determining Phase Fraction From The Measured Sound Speed

Turning back to FIG. 2, in particular, sensors 32, 34 provide sound speed measurements, by the method described above, which significantly enhance phase fraction determination over that of the prior art. Prior art phase fraction meters (microwave, dual beam densitometer, etc.) uniquely determine one of the phases of the fluid at the location of the meter. An advantage of the present invention is that a sound speed measurement does not uniquely determine the phase fractions, but rather provides a constraint on a combination of the phase fractions. In this manner, sound speed measurements are analogous to density measurements. The density of a well-mixed mixture of oil, water, and gas (immiscible mixture) is related to the phase fraction and the density of the individual components via the following relation:

$$\rho_{mix} = \rho_{oil}\phi_{oil} + \rho_w\phi_w + \rho_{gas}\phi_{gas} \quad \text{Eq. 16}$$

Similarly, the sound speed of the mixture is related to the sound speed, the density and the phase fraction via the following relation:

$$\frac{1}{\rho_{mix}a^2_{mix}} = \frac{\phi_{oil}}{\rho_{oil}a^2_{oil}} + \frac{\phi_w}{\rho_w a^2_w} + \frac{\phi_{gas}}{\rho_{gas}a^2_{gas}} \quad \text{Eq. 17}$$

Where: $\sum_{i=1}^{N} \phi_i = 1$

Where p is the density of the mix or constituent of the multi-component mixture, $\alpha$ is the sound speed of the mix or constituent of the mixture, and $\phi$ is the volumetric phase fraction of the mix or constituent of the mixture. Thus, knowledge of the sound speed and densities of the oil, water, and gas components provide a relation between the sound speed of the mixture and the in-situ phase fraction of the fluids.

Where the fluid is a two phase the speed of sound in a mixture $\alpha_{mix}$ is expressed as follows:

$$a_{mix} = \sqrt{\frac{1 + \frac{\rho_1}{\rho_2}\frac{\phi_2}{\phi_1}}{\frac{1}{a_1^2} + \frac{\rho_1}{\rho_2}\frac{\phi_2}{\phi_1}\frac{1}{a_2^2}}} \quad \text{Eq. 18}$$

where $\alpha_1$ and $\alpha_2$ are the known speeds of sound in the fluids, $p_1$ and $p_2$ are the known densities, $\phi_1$ and $\phi_2$ are the volumetric phase fractions of the two respective fluids, $\alpha_{mix}$ is the speed of sound in the mixture, and the densities $p_1$, $p_2$ of the two fluids are within about an order of magnitude (10:1) of each other. Other expressions relating the phase fraction to speed of sound may be used, which can be derived experimentally, analytically, or computationally.

Figure 14:
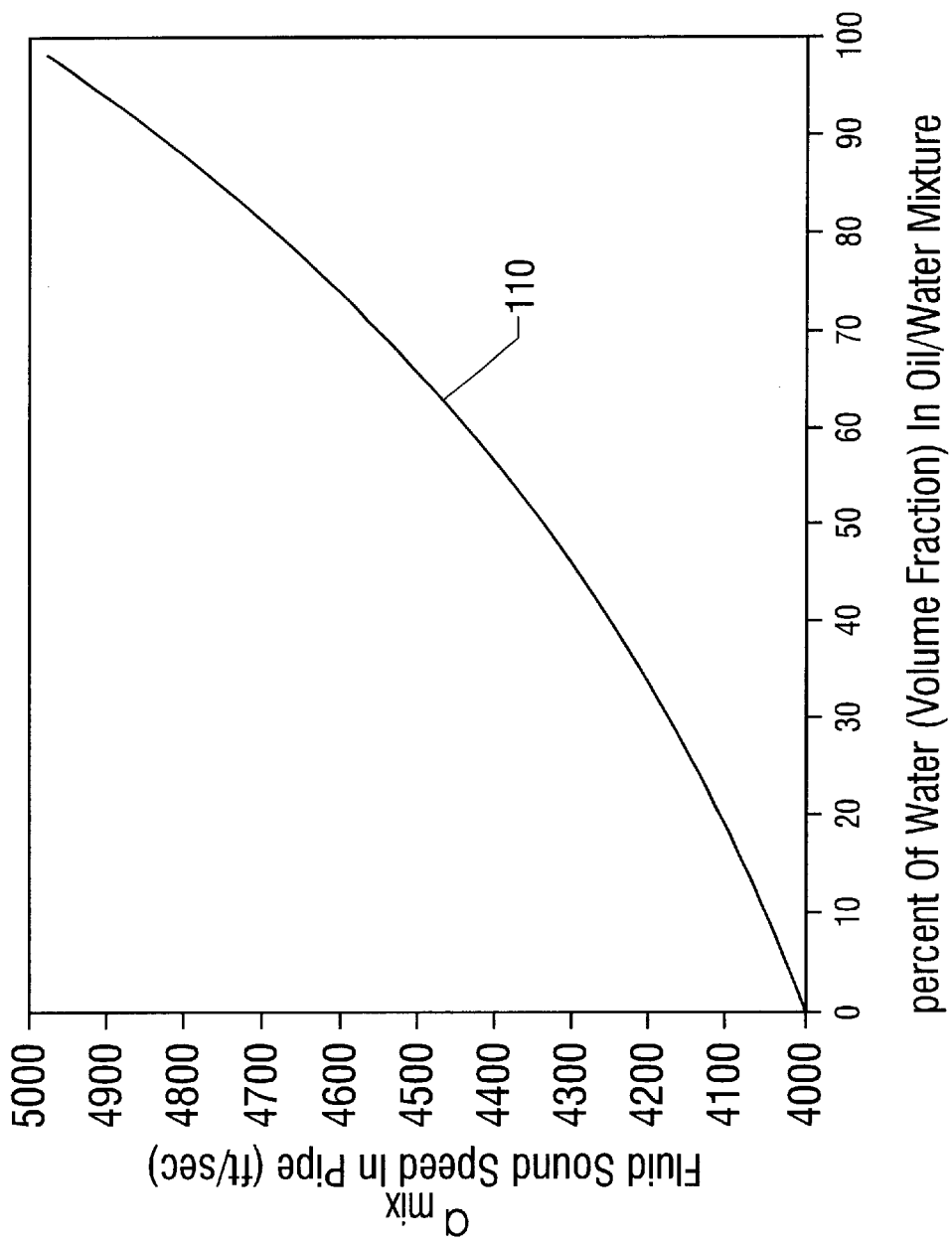
FIG. 14 is a graph of fluid sound speed versus the percent water volume fraction for an oil/water mixture, in accordance with one aspect of the present invention.

Referring to FIG. 14, where the fluid is an oil/water mixture, a curve 110 shows the speed of sound in the mixture $\alpha_{mix}$ plotted as a function of water volume fraction using Eq. 18. For this illustrative example, the values used for density (p) and speed of sound ($\alpha$) in oil and water are as follows:

Density (p): $p_{water}$=1,000 kg/m$^3$; $p_{oil}$=700 kg/m$^3$

Speed of sound ($\alpha$): $\alpha_{water}$=5,000 ft/sec; $\alpha_{oil}$=4,000 ft/sec.

The subscripts 1 and 2 of Eq. 18 assigned to the parameters for each fluid is arbitrary provided the notation used is consistent. Thus, if the speed of sound in the mixture arnix is measured, the oil/water fraction may be determined.

It should be understood that the present invention can be used to measure fluid volume fractions of a mixture of any number of fluids in which the speed of sound of the mixture $\alpha_{mix}$ is related to (or is substantially determined by) the volume fractions of two constituents of the mixture, e.g., oil/water, oil/gas, water/gas. The present invention can be used to measure the speed of sound of any mixture and can then be used in combination with other known quantities to derive phase content of mixtures with multiple (more than two) constituents.

II. BULK VELOCITY MEASUREMENTS

A. Basic Considerations

The present invention further includes velocity sensors 32, 34 and methods for determining bulk velocity or volumetric flow rates such as those described in U.S. patent application Ser. No. 09/346,607, entitled, "Flow Rate Measurement Using Unsteady Pressures," filed Jul. 2, 1999, the disclosure of which is incorporated herein by reference in its entirety and is discussed in some detail below. Similar to that described previously with regard to sound speed measurements, the volumetric flow rate based on a cross correlation based flow rate measurement significantly improves distributed measurement flow rate determination utilizing model 16. For well mixed flows of fluid 12 within a pipe 14, a homogeneous model 16 which assumes that all the phases are flowing at the same velocity may be sufficient. In other cases, slip models may be required to translate flow velocities provided from cross correlation measurements into individual component flow rates. In either case, the present invention incorporates cross correlation measurements that improve the predictive performance of the model 16 for multi-phase flow Qw information. As described below, the sensors provide bulk velocity measurement to model 16 (FIG. 2) by measuring vortical pressures in the fluid. As one skilled in the art would recognize the embodiment described below may be referred to as a flow meter.

Figure 16:
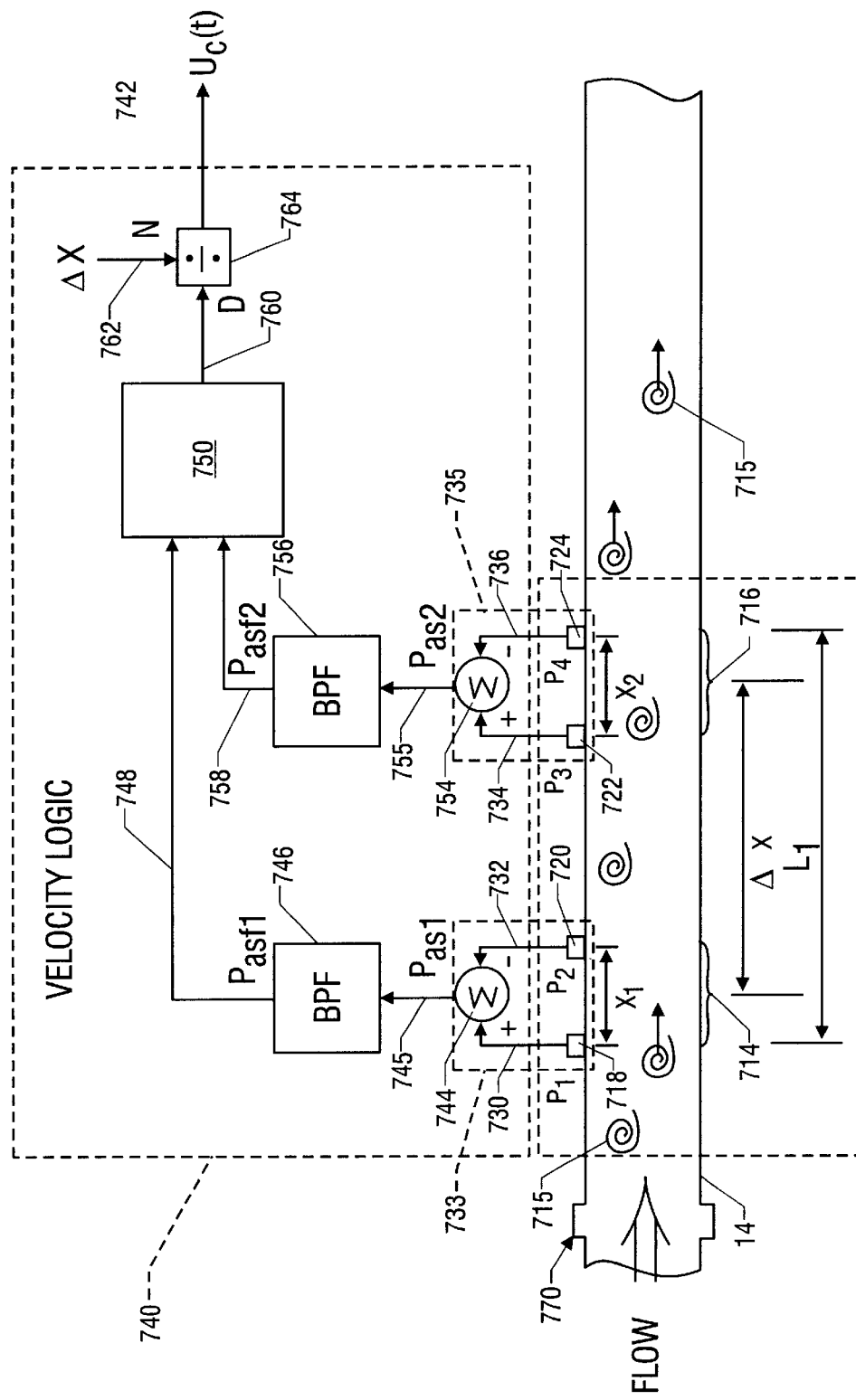
FIG. 16 is a schematic block diagram of a velocity measurement system, in accordance with one aspect of the present invention.

Referring to FIG. 16, a velocity and flow measurement system includes a sensing section 710 along a pipe, or conduit, 14 and a velocity logic section 740. The pipe 14 has two measurement regions 714, 716 located a distance $\Delta X$ apart along the pipe 14. At the first measurement region 714 are two unsteady (or dynamic or ac) pressure sensors 718, 720, located a distance $X_1$ apart, capable of measuring unsteady vortical pressures in the pipe 14, and at the second measurement region 716, are two other unsteady pressure sensors 722, 724, located a distance $X_2$ apart, also capable of measuring unsteady vortical pressures in the pipe 14. Each pair of pressure sensors 718, 720 and 722, 724 act as spatial filters to remove certain acoustic signals from the unsteady pressure signals, and the distances $X_1$, $X_2$ are determined by the desired filtering characteristic for each spatial filter, as discussed hereinafter.

The flow measurement system 710 of the present invention measures velocities associated with unsteady flow fields and/or pressure disturbances represented by 715 such as turbulent eddies (or vortical flow fields), inhomogeneities in the flow (such as bubbles, slugs, and the like), or any other properties of the flow, fluid, or pressure, having time varying or stochastic properties in the form of unsteady pressures. The vortical flow fields 715 are, in general, comprised of pressure disturbances having a wide variation in length scales and which have a variety of coherence length scales such as that described in the reference "Sound and Sources of Sound," A. P. Dowling et al, Halsted Press, 1983. Vortical flow fields often convect at or near the mean velocity of at least one of the fluids within a mixture flowing in a pipe. More specifically, the vortices convect in a predictable manner with reference to the fluids. The vortical pressure disturbances 715 that contain information regarding convection velocity have temporal and spatial length scales as well as coherence length scales that differ from other disturbances in the flow. The present invention utilizes these properties to preferentially select disturbances of a desired axial length scale and coherence length scale as will be more fully described hereinafter. For illustrative purposes, the terms vortical flow field and vortical pressure field will be used to describe the above-described group of unsteady pressure fields having temporal and spatial length and coherence scales described.

The pressures $P_1$, $P_2$, $P_3$, $P_4$ may be measured through holes in the pipe 14 ported to external pressure sensors or by other techniques discussed hereinafter. The pressure sensors 718, 720, 722, 724 provide time-based pressure signals $P_1(t)$, $P_2(t)$, $P_3(t)$, $P_4(t)$ on lines 730, 732, 734, 736, respectively, to Velocity Logic 740 which provides a convection velocity signal $U_c(t)$ on a line 742 which is related to an average flow rate $U_f(t)$ of the fluid flowing in the pipe 14 (where fluid may comprise one or more liquids and/or gases; where the gas(es) may be dissolved in the liquid or in free gas form, and wherein the fluid may include non-liquid elements).

In particular, in the Velocity Logic 740, the pressure signal $P_1(t)$ on the line 730 is provided to a positive input of a summer 744 and the pressure signal $P_2(t)$ on the line 732 is provided to a negative input of the summer 744. The output of the summer 744 is provided on a line 745 indicative of the difference between the two pressure signals $P_1$, $P_2$ (e.g., $P_1 - P_2 = P_{as1}$).

The pressure sensors 718, 720 together with the summer 744 create a spatial filter 733. The line 745 is fed to bandpass filter 746, which passes a predetermined passband of frequencies and attenuates frequencies outside the passband. In accordance with the present invention, the passband of the filter 746 is set to filter out (or attenuate) the dc portion and the high frequency portion of the input signals and to pass the frequencies therebetween. For example, in a particular embodiment bandpass filter 746 is set to pass frequencies from about 1 Hz to about 100 Hz, for a 3 inch ID pipe flowing water at 10 ft/sec. Other passbands may be used in other embodiments, if desired. Bandpass filter 746 provides a filtered signal $P_{asf1}$ on a line 748 to Cross-Correlation Logic 750, described below.

The pressure signal $P_3(t)$ on the line 734 is provided to a positive input of a summer 754 and the pressure signal $P_4(t)$ on the line 736 is provided to a negative input of the summer 754. The pressure sensors 722, 724 together with the summer 754 create a spatial filter 735. The output of the summer 754 is provided on a line 755 indicative of the difference between the two pressure signals $P_3$, $P_4$ (e.g., $P_3 - P_4 = P_{as2}$) The line 755 is fed to a bandpass filter 756, similar to the bandpass filter 746 discussed hereinbefore, which passes frequencies within the passband and attenuates frequencies outside the passband. The filter 756 provides a filtered signal $P_{asf2}$ on a line 758 to the Cross-Correlation Logic 750. The signs on the summers 744, 754 may be swapped if desired provided the signs of both summers 744, 754 are swapped together. In addition, the pressure signals $P_1$, $P_2$, $P_3$, $P_4$ may be scaled prior to presentation to the summers 744, 754.

The Cross-Correlation Logic 750 calculates a known time domain cross-correlation between the signals $P_{asf1}$ and $P_{af2}$ on the lines 748, 758, respectively, and provides an output signal on a line 760 indicative of the time delay T it takes for an vortical flow field 715 (or vortex, stochastic, or vortical structure, field, disturbance or perturbation within the flow) to propagate from one sensing region 714 to the other sensing region 716. Such vortical flow disturbances, as is known, are coherent dynamic conditions that can occur in the flow which substantially decay (by a predetermined amount) over a predetermined distance (or coherence length) and convect (or flow) at or near the average velocity of the fluid flow. As described above, the vortical flow field 715 also has a stochastic or vortical pressure disturbance associated with it. In general, the vortical flow disturbances 715 are distributed throughout the flow, particularly in high shear regions, such as boundary layers (e.g., along the inner wall of the pipe 14) and are shown as discrete vortical flow fields 715. Because the vortical flow fields 715 (and the associated pressure disturbance) convect at or near the mean flow velocity, the propagation time delay T is related to the velocity of the flow by the distance $\Delta X$ between the measurement regions 714, 716, as discussed below.

A spacing signal $\Delta X$ on a line 762 indicative of the distance $\Delta X$ between the sensing regions 714, 716 is divided by the time delay signal T on the line 760 by a divider 764 which provides an output signal on the line 742 indicative of the convection velocity $U_c(t)$ of the fluid flowing in the pipe 14, which is related to (or proportional to or approximately equal to) the average (or mean) flow velocity $U_f(t)$ of the fluid, as defined below:

$$U_c(t) = \Delta X/\tau \propto U_f(t) \qquad \text{Eq. 19}$$

The convection velocity $U_c(t)$ may then be calibrated to more precisely determine the mean velocity $U_f(t)$ if desired. The result of such calibration may require multiplying the value of the convection velocity $U_c(t)$ by a calibration constant (gain) and/or adding a calibration offset to obtain the mean flow velocity $U_f(t)$ with the desired accuracy. For some applications, such calibration may not be required to meet the desired accuracy. The velocities $U_f(t), U_c(t)$ may be converted to volumetric flow rate by multiplying the velocity by the cross-sectional area of the pipe.

Figure 17:
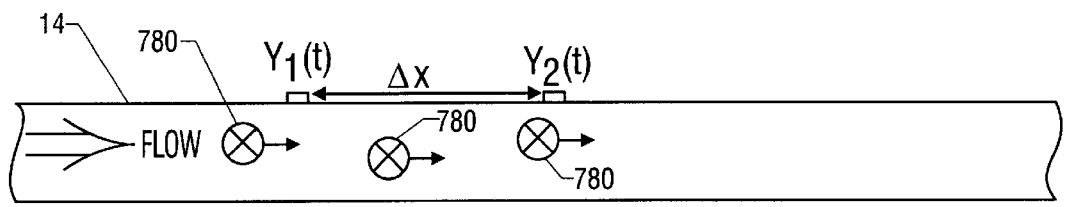
FIG. 17 is a side view of a pipe having two sensors that measure a vortical pressure in the pipe, as is known in the art.
Figure 18:
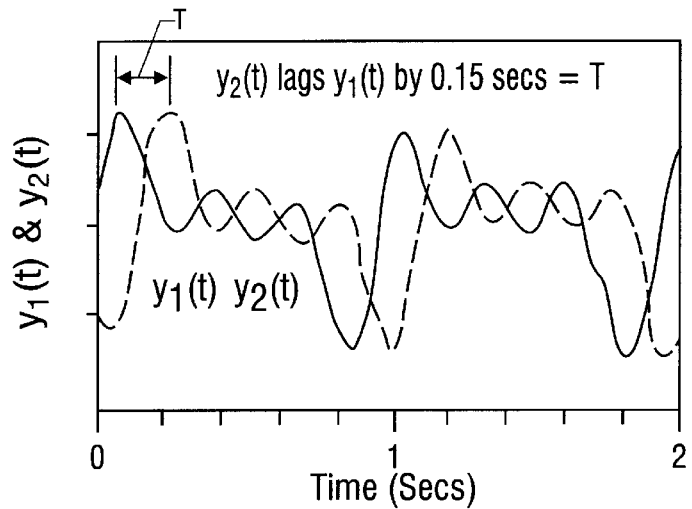
FIG. 18 is a graph of two curves, one from each of the two sensors of FIG. 17.
Figure 19:
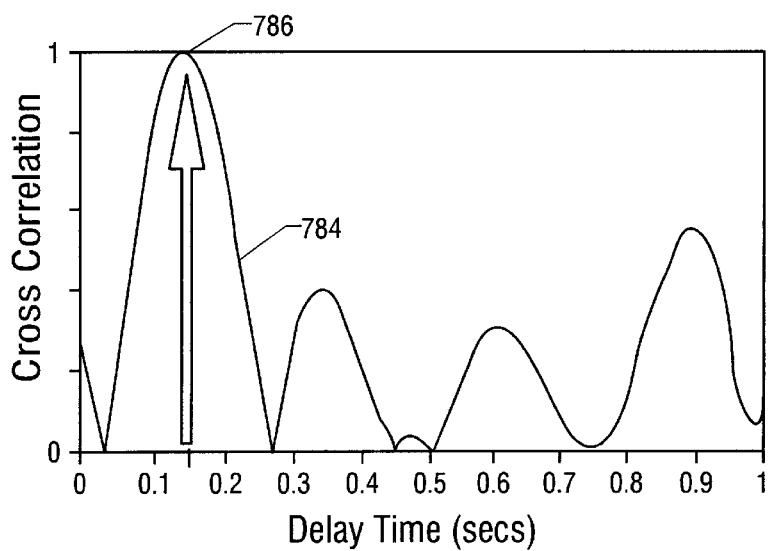
FIG. 19 is a graph of a cross-correlation between the two curves of FIG. 18.

Referring to FIGS. 17, 18, 19 as is known, cross-correlation may be used to determine the time delay T between two signals $y_1(t), y_2(t)$ separated by a known distance $\Delta X$, that are indicative of quantities 780 that convect with the flow (e.g., density perturbations, concentration perturbations, temperature perturbations, vortical pressure disturbances, and other quantities). In FIG. 18, the signal $y_2(t)$ lags behind the signal $y_1(t)$ by 0.15 seconds. If a time domain cross-correlation is taken between the two signals $y_1(t), y_2(t)$, the result is shown in FIG. 19 as a curve 784. The highest peak 786 of the curve 784 shows the best fit for the time lag T between the two signals $y_1(t), y_2(t)$ is at 0.15 seconds which matches the reference time delay shown in FIG. 18.

Referring to FIG. 16, as discussed hereinbefore, since pressure disturbances associated within the vortical flow field 715 convect (or flow) at or near the average velocity of the fluid flowing in the pipe 14, the vortical pressure disturbances observed at the downstream location 716 are substantially a time lagged version of the vortical pressure disturbances observed at the upstream location 714. However, the total vortical pressure perturbations or disturbances in a pipe may be expressed as being comprised of vortical pressure disturbances ($P_{vortical}$), acoustic pressure disturbances ($P_{acoustic}$) and other types of pressure disturbances ($P_{other}$) as shown below expressed in terms of axial position along the pipe at any point in time:

$$P(x,t) = P_{vortical}(x,t) + P_{acoustic}(x,t) + P_{other}(x,t) \qquad \text{Eq. 20}$$

As a result, the unsteady pressure disturbances $P_{vortical}$ can be masked by the acoustic pressure disturbances $P_{acoustic}$ and the other types of pressure disturbances $P_{other}$. In particular, the presence of the acoustic pressure disturbances that propagate both upstream and downstream at the speed of sound in the fluid (sonic velocity), can prohibit the direct measurement of velocity from cross-correlation of direct vortical pressure measurements.

The present invention uses temporal and spatial filtering to precondition the pressure signals to effectively filter out the acoustic pressure disturbances $P_{acoustic}$ and other long wavelength (compared to the sensor spacing) pressure disturbances in the pipe 14 at the two sensing regions 714, 716 and retain a substantial portion of the vortical pressure disturbances $P_{vortical}$ associated with the vortical flow field 715 and any other short wavelength (compared to the sensor spacing) low frequency pressure disturbances $P_{other}$. In accordance with the present invention, if the low frequency pressure disturbances $P_{other}$ are small, they will not substantially impair the measurement accuracy of $P_{vortical}$.

The $P_{vortical}$ dominated signals from the two regions 714, 716 are then cross-correlated to determine the time delay T between the two sensing locations 714, 716. More specifically, at the sensing region 714, the difference between the two pressure sensors 718, 720 creates a spatial filter 733 that effectively filters out (or attenuates) acoustic disturbances for which the wavelength λ of the acoustic waves propagating along the fluid is long (e.g., ten-to-one) compared to the spacing $X_1$ between the sensors. Likewise the same is true for spatial filter 735. Other wavelength to sensor spacing ratios may be used to characterize the filtering, provided the wavelength to sensor spacing ratio is sufficient to satisfy the two-to-one spatial aliasing Nyquist criteria.

Figure 20:
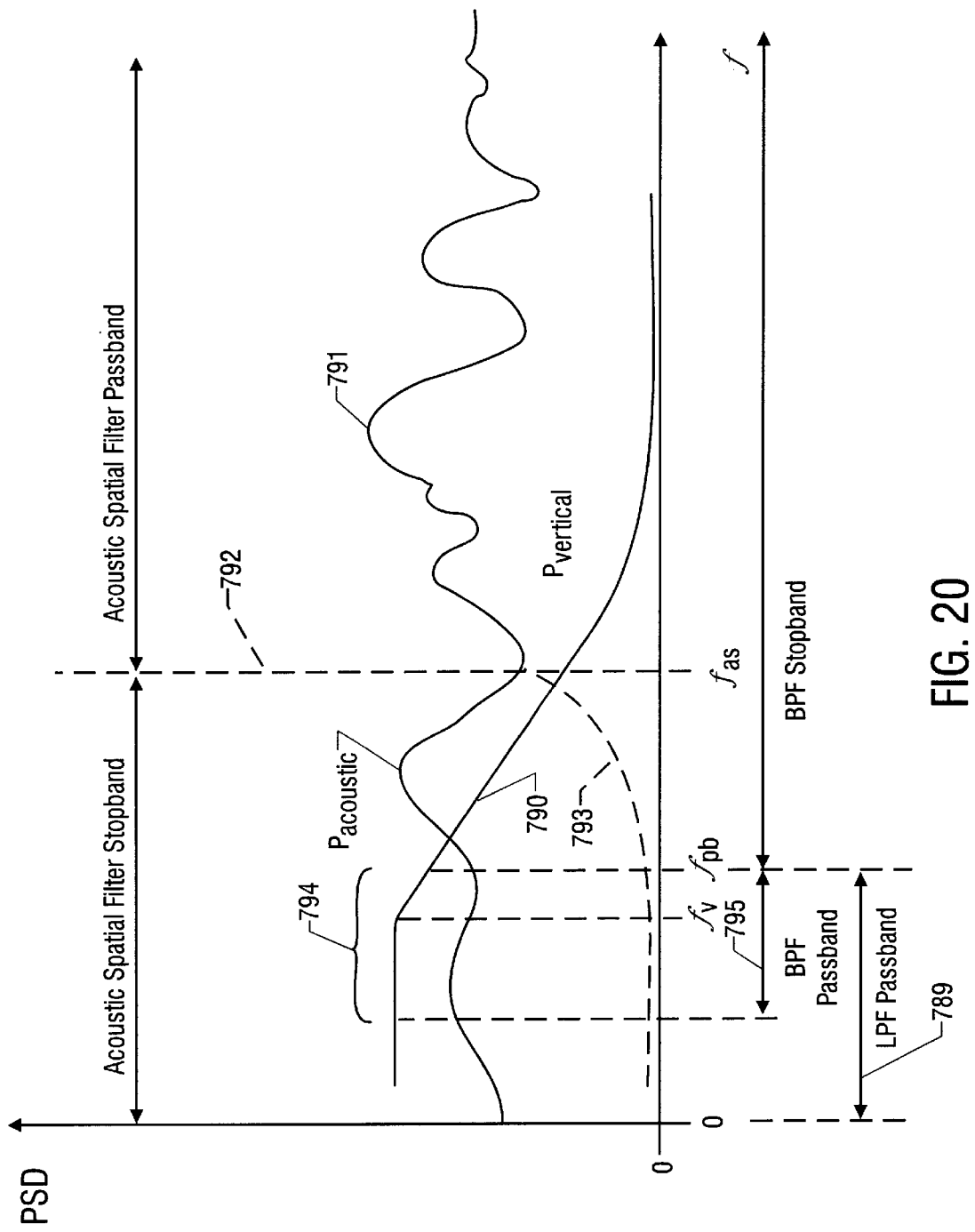
FIG. 20 is a graph of power spectral density plotted against frequency for an unsteady acoustic pressure signal $P_{acoustic}$ and unsteady vortical pressure signal $P_{vortical}$, in accordance with one aspect of the present invention.

Referring to FIG. 20, relevant features of the power spectral density (PSD) of typical vortical pressure disturbances $P_{vortical}$ is shown by a curve 790 that has a flat region (or bandwidth) up to a frequency $F_v$ and then decreases with increasing frequency f. The value of $F_v$ is approximately equal to U/r, where U is the flow rate and r is the radius of the pipe. For example, for a flow rate U of about 10 ft/sec and a pipe radius r of about 0.125 ft (or about 1.5 inches), the bandwidth $F_v$ of the vortical pressure disturbances $P_{vortical}$ would be about 80 Hz (10/0.125). The PSD of the acoustic pressure disturbances $P_{acoustic}$ has a profile that is determined by the environment and other factors and is indicated in the figure by an arbitrary curve 791, and typically has both low and high frequency components.

The acoustic spatial filters 733, 735 (FIG. 16) discussed hereinbefore block or attenuate wavelengths longer than $\lambda_{as}$ and frequencies below $f_{as}$, as indicated by the region 796. Also, the bandpass filters (BPF) 746, 756 (FIG. 16) block or attenuate high frequencies above $f_{pb}$ having short and long wavelengths and pass frequencies below $f_{as}$ where the $P_{vortical}$ signals exist. Thus, after the spatial filters 733, 735 and the BPF's 746, 756, the resultant filtered signals $P_{asf1}$, $P_{asf2}$ on the lines 748, 758 (FIG. 16) will be dominated by the short wavelength unsteady pressure disturbances $P_{vortical}$ at frequencies below $f_{pb}$ and as indicated by a portion 794 of the curve 790 in the BPF passband 795 (FIG. 20).

Accordingly, referring to FIG. 20, the spatial filters 733, 735 (FIG. 16) block the long wavelengths, which, for the acoustic pressure disturbances $P_{acoustic}$, occur at low frequencies as indicated to the left of a dashed line 792 at frequencies below the frequency $f_{as}$. A dashed line 793 indicates the attenuation of the acoustic pressure $P_{acoustic}$ signal 791 below the frequency $f_{as}$ at the output of the spatial filters. The vortical pressure disturbances $P_{vortical}$ are substantially not attenuated (or only slightly attenuated) because $P_{vortical}$ has short wavelengths at low frequencies that are substantially passed by the spatial filter. The BPF's 746, 756 (FIG. 16) block or attenuate frequencies outside the passband indicated by a range of frequencies 795, and passes the unsteady pressure disturbances associated with stochastic flow fields 715 (FIG. 16) within the passband 795.

Alternatively, instead of the filters 746, 756 being bandpass filters, provided the dc content is acceptably small, the filters 746, 756 may comprise low pass filters, having a bandwidth similar to the upper band of the high pass filters discussed hereinbefore. If a low pass filter is used as the filters 746, 756, the passband is shown as a range of frequencies 789. It should be understood that the filters 746, 756 are not required for the present invention if the PSD of the acoustic pressure disturbances $P_{acoustic}$ has substantially no or low PSD energy content in frequencies above the stopband of the spatial filter that does not adversely affect the measurement accuracy.

Figure 21:
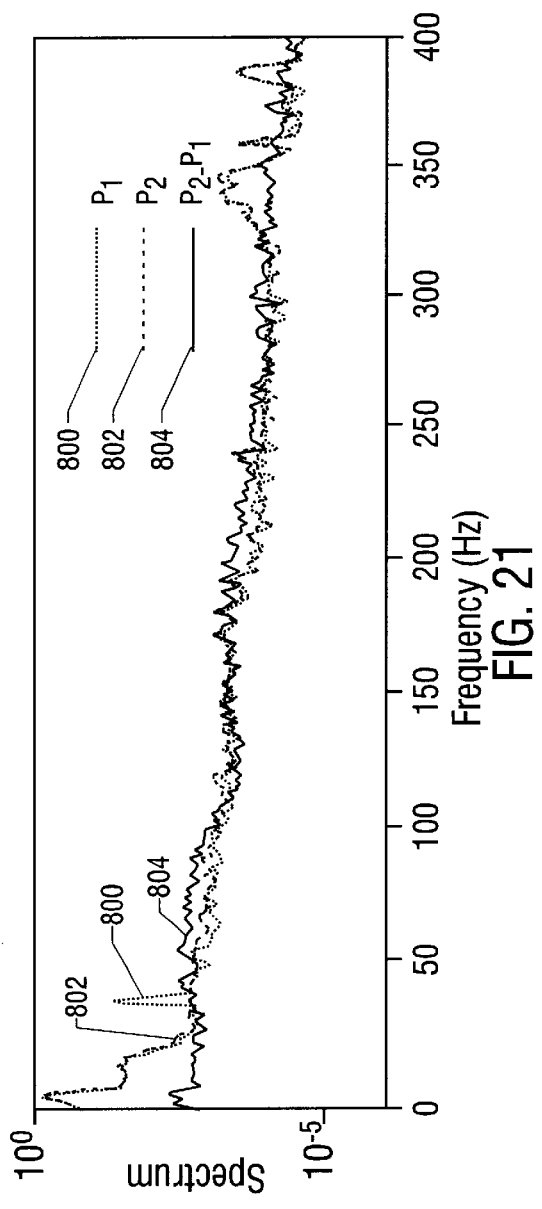
FIG. 21 is a graph of power spectrum of two unsteady vortical pressures and the difference between the two pressures, in accordance with one aspect of the present invention.

Referring to FIGS. 21 and 16, for the four ac pressure sensors 718, 720, 722,724 evenly axially spaced at 1 inch apart $(X_1, X_2)$ along the pipe 14, and providing ac pressure signals $P_1, P_2, P_3, P_4$, respectively, the frequency power spectrum for $P_1$ and $P_2$ are shown by curves 800, 802, respectively, for water flowing in an horizontal flow loop at a velocity of 11.2 ft/sec in a 2 inch diameter schedule 780 pipe using conventional piezoelectric ac pressure transducers. The power spectra of the curves 800, 802 are nearly identical. The power spectrum of the difference $P_{as1}$ between the two signals $P_1, P_2$, shown by a curve 804 is reduced in certain frequency bands (e.g., 100–150 Hz) and increased in other frequency bands (e.g., 200–250 Hz) as compared to the individual signals 800, 802.

Figure 22:
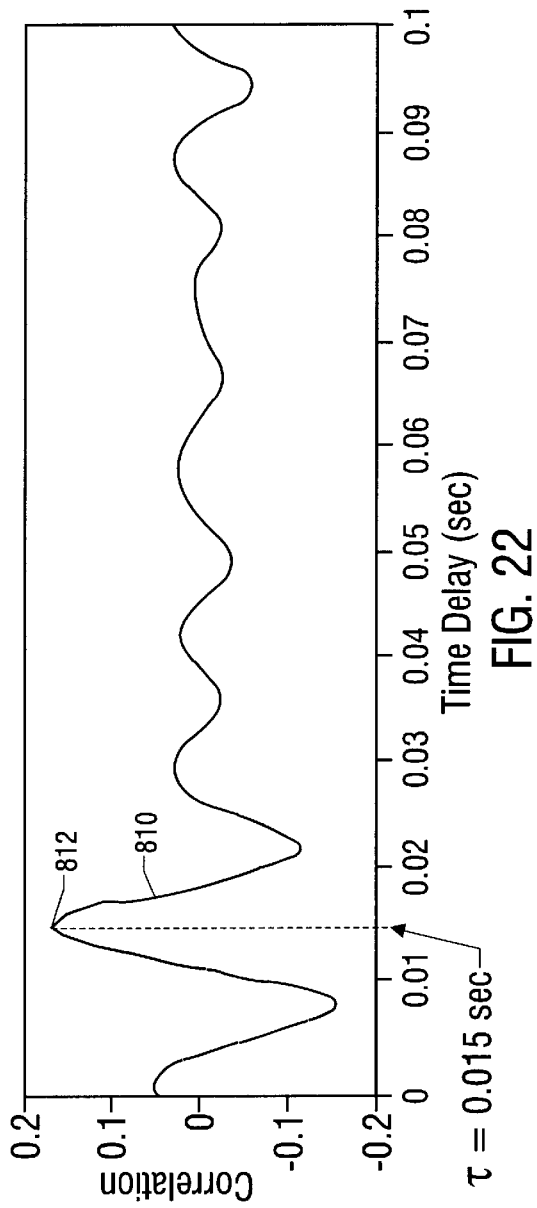
FIG. 22 is a graph of a cross-correlation between two of the curves of FIG. 21, in accordance with one aspect of the present invention.

Referring to FIGS. 22 and 16, the cross correlation between the signals $P_{as1}$ (or $P_1$–$P_2$) and $P_{as2}$ ($P_3$–$P_4$) is shown as a curve 810. The highest peak 812 indicates the best fit for the time lag between the two signals $P_{as1}, P_{as2}$ as 0.015 seconds. Because the four sensors $P_1$ to $P_4$ were evenly axially spaced 1 inch apart, the effective distance ΔX between the sensor pairs is 2 inches. Thus, the velocity measured from Eq. 19 is 11.1 ft/sec (2/12/0.015 ) using the present invention and the actual velocity was 11.2 ft/sec.

Figure 23:
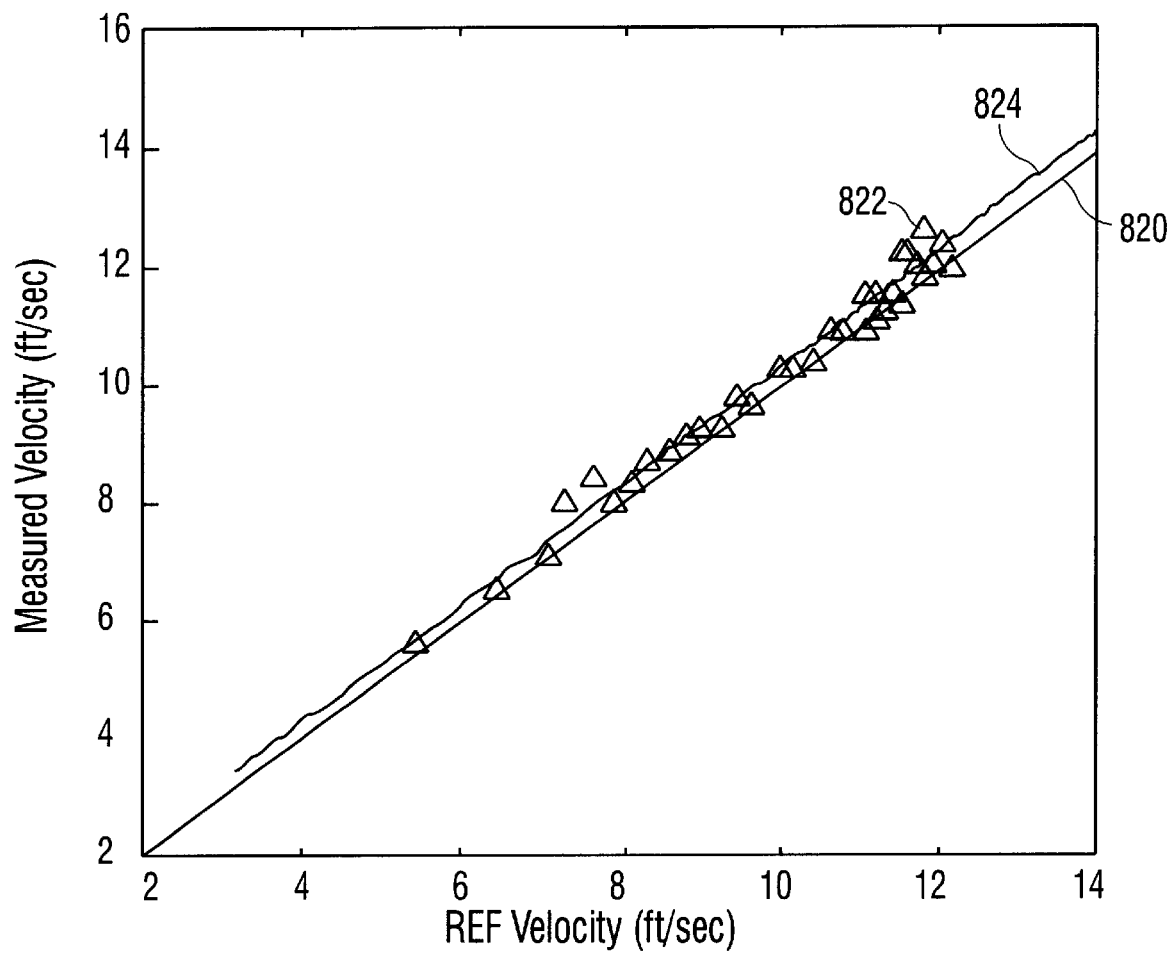
FIG. 23 is a graph of measured velocity against reference velocity, in accordance with one aspect of the present invention.

Referring to FIG. 23, for the configuration described with FIGS. 16, 21, 22 above, the velocity was measured at various flow rates and plotted against a reference velocity value. A solid line 820 shows the reference velocity, the triangles 822 are the measured data, and a line 824 is a curve fit of the data 822. This illustrates that the present invention predicts the flow velocity within a pipe (or conduit).

B. Fiber Optic Embodiments For Velocity Sensors

Figure 24:
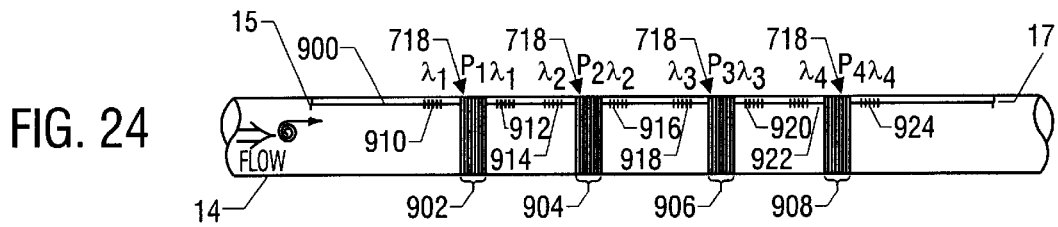
FIG. 24 is a side view of a pipe having optical fiber wrapped around the pipe at each measurement location separated by a pair of Bragg gratings, in accordance with one aspect of the present invention.
Figure 25:
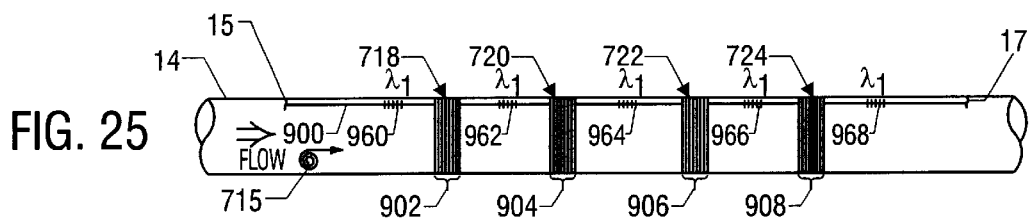
FIG. 25 is a side view of a pipe having optical fiber wrapped around the pipe at each measurement location with a single Bragg grating between each pair of optical wraps, in accordance with one aspect of the present invention.
Figure 26:
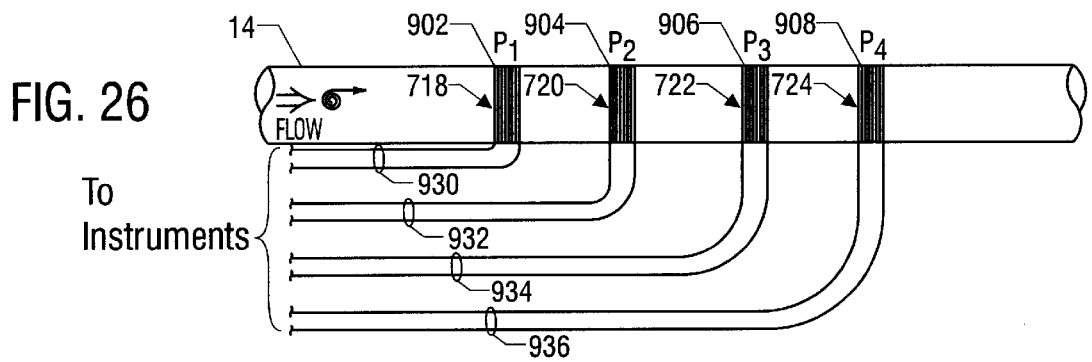
FIG. 26 is a side view of a pipe having optical fiber wrapped around the pipe at each measurement location without Bragg gratings, in accordance with one aspect of the present invention.

Referring to FIGS. 24, 25, 26 if an optical strain gage is used, the ac pressure sensors 718–724 may be configured using an optical fiber 900 that is coiled or wrapped around and attached to the pipe 14 at each of the pressure sensor locations as indicated by the coils or wraps 902, 904, 906, 908 for the pressures $P_1, P_2, P_3, P_4$, respectively. The fiber wraps 902–908 are wrapped around the pipe 14 such that the length of each of the fiber wraps 902–908 changes with changes in the pipe loop strain in response to unsteady pressure variations within the pipe 14 and thus internal pipe pressure is measured at the respective axial location. Such fiber length changes are measured using known optical measurement techniques as discussed hereinafter. Each of the wraps measures substantially the circumferentially averaged pressure within the pipe 14 at a corresponding axial location on the pipe 14. Also, the wraps provide axially averaged pressure over the axial length of a given wrap. While the structure of the pipe 14 provides some spatial filtering of short wavelength disturbances, we have found that the basic principle of operation of the invention remains substantially the same as that for the point sensors described previously.

Referring to FIG. 24, for embodiments of the present invention where the wraps 902, 904, 906, 908 are connected in series, pairs of Bragg gratings (910, 912), (914, 916), (918, 920), (922, 924) may be located along the fiber 900 at opposite ends of each of the wraps 902, 904, 906, 908, respectively. The grating pairs are used to multiplex the pressure signals $P_1$, $P_2$, $P_3$, $P_4$ to identify the individual wraps from optical return signals. The first pair of gratings 910, 912 around the wrap 902 may have a common reflection wavelength $\lambda_1$, and the second pair of gratings 914, 916 around the wrap 904 may have a common reflection wavelength $\lambda_2$, but different from that of the first pair of gratings 910, 912. Similarly, the third pair of gratings 918, 920 around the wrap 906 have a common reflection wavelength $\lambda_3$, which is different from $\lambda_1$, $\lambda_2$, and the fourth pair of gratings 922, 924 around the wrap 908 have a common reflection wavelength $\lambda_4$, which is different from $\lambda_1$, $\lambda_2$, $\lambda_3$. The fiber 400 may continue to other sensors as shown by reference numeral 17 or return the optical signals to the instrument as shown by reference numeral 15.

Referring to FIG. 25, instead of having a different pair of reflection wavelengths associated with each wrap, a series of Bragg gratings 960–968 with only one grating between each of the wraps 902–908 may be used each having a common reflection wavelength $\lambda_1$.

Referring to FIGS. 24 and 25 the wraps 902–908 with the gratings 910–924 (FIG. 24) or with the gratings 960–968 (FIG. 25) may be configured in numerous known ways to precisely measure the fiber length or change in fiber length, such as an interferometric, Fabry Perot, time-of-flight, or other known arrangements. An example of a Fabry Perot technique is described in U.S. Pat. No. 4,950,883, entitled "Fiber Optic Sensor Arrangement Having Reflective Gratings Responsive to Particular Wavelengths," to Glenn. One example of time-of-flight (or Time-Division-Multiplexing; TDM) would be where an optical pulse having a wavelength is launched down the fiber 900 and a series of optical pulses are reflected back along the fiber 900. The length of each wrap can then be determined by the time delay between each return pulse.

While the gratings 910–924 are shown oriented axially with respect to the pipe 14, in FIGS. 24 and 25, they may be oriented along the pipe 14 axially, circumferentially, or in any other orientations. Depending on the orientation, the grating may measure deformations in the pipe wall 952 with varying levels of sensitivity. If the grating reflection wavelength varies with internal pressure changes, such variation may be desired for certain configurations (e.g., fiber lasers) or may be compensated for in the optical instrumentation for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 900.

Referring to FIG. 26, alternatively, the sensors 718–724 may also be formed as individual non-multiplexed interferometric sensor by wrapping the pipe 14 with the wraps 902–908 without using Bragg gratings where separate fibers 930, 932, 934, 936 may be fed to the separate wraps 902, 904, 906, 908, respectively. In this particular embodiment, known interferometric techniques may be used to determine the length or change in length of the fiber 710 around the pipe 14 due to pressure changes, such as Mach Zehnder or Michaelson Interferometric techniques, such as that described in U.S. Pat. No. 5,218,197, entitled "Method And Apparatus For The Non-Invasive Measurement Of Pressure Inside Pipes Using A Fiber Optic Interferometer Sensor," to Carroll.

The interferometric wraps may be multiplexed such as is described in Dandridge, et al, "Fiber Optic Sensors for Navy Applications," IEEE, Feb. 1991, or Dandridge, et al, "Multiplexed Interferometric Fiber Sensor Arrays," SPIE, Vol. 1586, 1991, pp. 176–183. Other techniques to determine the change in fiber length may be used. Also, reference optical coils (not shown) may be used for certain interferometric approaches and may also be located on or around the pipe 14 but may be designed to be insensitive to pressure variations.

Figure 27:
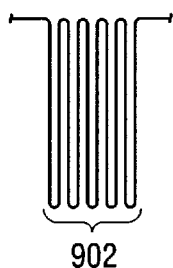
FIG. 27 is an alternative geometry of an optical wrap of a radiator tube geometry, in accordance with one aspect of the present invention.
Figure 28:
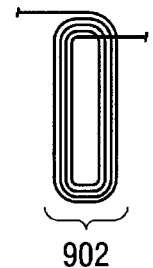
FIG. 28 is an alternative geometry of an optical wrap of a race track geometry, in accordance with one aspect of the present invention.

Referring to FIGS. 27 and 28, instead of the wraps 902–908 being optical fiber coils wrapped completely around the pipe 14, the wraps 902–908 may have alternative geometries, such as a "radiator coil" geometry (FIG. 27) or a "race-track" geometry (FIG. 28), which are shown in a side view as if the pipe 14 is cut axially and laid flat. In this particular embodiment, the wraps 902–908 are not necessarily wrapped 360 degrees around the pipe, but may be disposed over a predetermined portion of the circumference of the pipe 14, and have a length long enough to optically detect the changes to the pipe circumference. Other geometries for the wraps may be used if desired. Also, for any geometry of the wraps described, more than one layer of fiber may be used depending on the overall fiber length desired. The desired axial length of any particular wrap is set depending on the characteristics of the ac pressure desired to be measured, for example the axial length of the pressure disturbance caused by a vortex to be measured.

Figure 29:
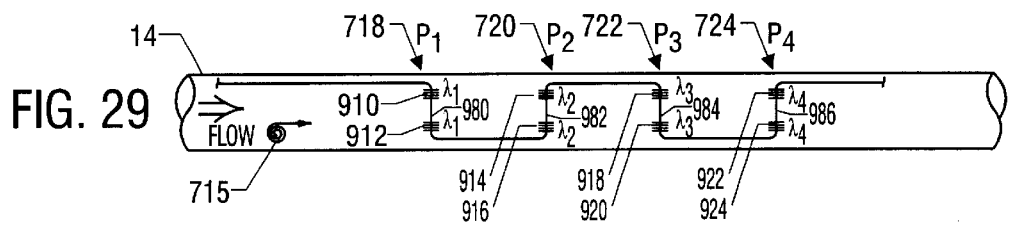
FIG. 29 is a side view of a pipe having a pair of gratings at each axial sensing location, in accordance with one aspect of the present invention.
Figure 30:
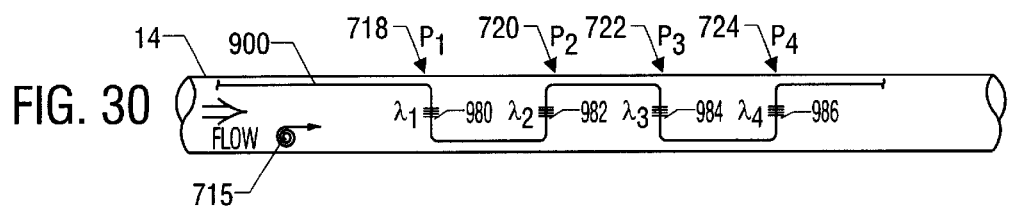
FIG. 30 is a side view of a pipe having a single grating at each axial sensing location, in accordance with one aspect of the present invention.

Referring to FIGS. 29 and 30, embodiments of the present invention include configurations wherein instead of using the wraps 902–908, the fiber 900 may have shorter sections that are disposed around at least a portion of the circumference of the pipe 14 that can optically detect changes to the pipe circumference. It is further within the scope of the present invention that sensors may comprise an optical fiber 900 disposed in a helical pattern (not shown) about pipe 14. As discussed above, the orientation of the strain sensing element will vary the sensitivity to deflections in pipe wall 952 caused by unsteady pressure transients in the pipe 14.

Referring to FIG. 29, in particular, the pairs of Bragg gratings (910, 912), (914, 916), (918, 920), (922, 924) are located along the fiber 900 with sections 980–986 of the fiber 900 between each of the grating pairs, respectively. In that case, known Fabry Perot, interferometric, time-of-flight or fiber laser sensing techniques may be used to measure the strain in the pipe, in a manner similar to that described in the aforementioned references.

Referring to FIG. 30, alternatively, individual gratings 970–976 may be disposed on the pipe and used to sense the unsteady variations in strain in the pipe 14 (and thus the unsteady pressure within the pipe) at the sensing locations. When a single grating is used per sensor, the grating reflection wavelength shift will be indicative of changes in pipe diameter and thus pressure.

Any other technique or configuration for an optical strain gage may be used. The type of optical strain gage technique and optical signal analysis approach is not critical to the present invention, and the scope of the invention is not intended to be limited to any particular technique or approach.

The present invention will also work over a wide range of oil/water/gas mixtures. Also, the invention will work for very low flow velocities, e.g., at or below 1 ft/sec (or about 20.03 gal/min, in a 3 inch diameter ID pipe) and has no maximum flow rate limit. Further, the invention will work with the pipe 14 being oriented vertical, horizontal, or any other orientation. Also the invention will work equally well independent of the direction of the flow along the pipe 14.

The thickness and rigidity of the outer wall of the pipe 14 is related to the acceptable spacing $X_1$ (FIG. 1) between the sensors 718, 720 of the spatial filter 733. More specifically, the thinner or less rigid the pipe 14 wall, the closer the sensors 718, 720 can be to each other.

Also, for optimal performance, the distance $X_1$ between the two sensors 718, 720 should be larger than the spatial length of the vortical pressure field 715 such that each of the sensors 718, 720 can independently measure the propagating vortical pressure field 715 between the sensors 718, 720 at different times (such that the spatial filter 733 output is not zero for the measured vortex 715). Also, the distance $X_1$ should be within the coherence length of the vortex 715 such that the spatial filter output is indicative of a measured vortex 715. Also, for optimal performance, the overall length $L_1$ between the first sensor 718 and the last sensor 724 of the velocity sensing section should be within the coherence length of the vortices 715 desired to be measured. The coherence length of the vortical flow field 715 is the length over which the vortical flow field remains substantially coherent, which is related to and scales with the diameter of the pipe 14.

Vortices that are sensed by only one of the spatial filters, because either a vortex is generated between the spatial filters or generated outside the spatial filters and decay between them, will be substantially random events (in time and location) that will not be correlated to the vortices that are sensed by and continuously occurring past both spatial filters and, as such, will not significantly affect the accuracy of the measurement.

Figure 31:
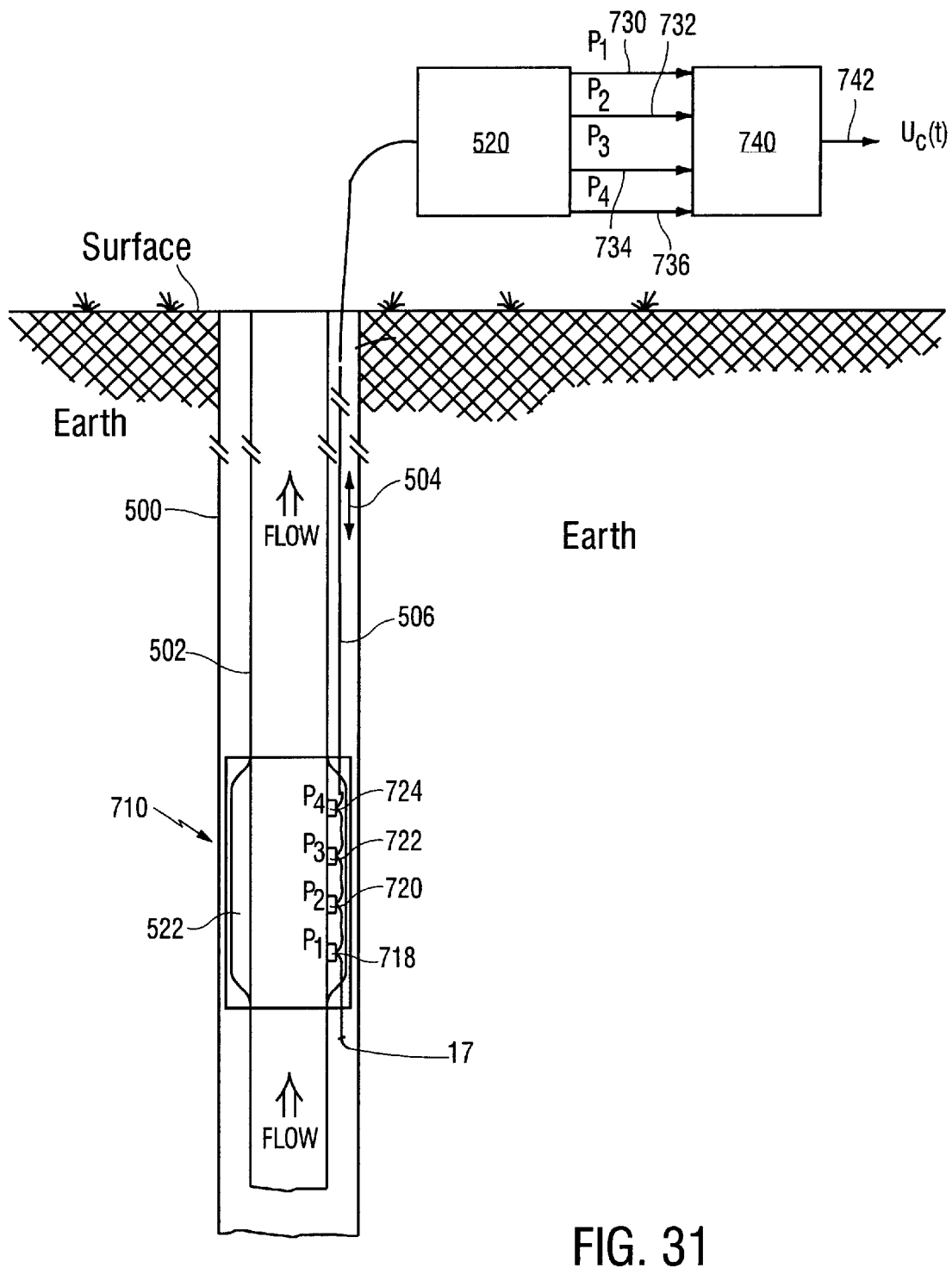
FIG. 31 is a schematic block diagram of a velocity measurement system in an oil or gas well application, using fiber optic sensors, in accordance with one aspect of the present invention.

FIG. 31 illustrates an embodiment of a velocity measurement system in an oil or gas well application. The sensing section 710 may be connected to or part of production tubing 502 within a well 500. An outer housing, sheath, or cover 522 may be located over the sensors 718–724 and attached to the pipe (not shown) at the axial ends to protect the sensors 718–724 (or fibers) from damage during deployment, use, or retrieval, and/or to help isolate the sensors from external pressure effects that may exist outside the pipe 14, and/or to help isolate ac pressures in the pipe 14 from ac pressures outside the pipe 14. The sensors 718–724 are connected to a cable 506 which may comprise the optical fiber 900 (FIG. 16) and is connected to a transceiver/converter 520 located outside the well.

When optical sensors are used, the transceiver/converter 520 may be used to receive and transmit optical signals to the sensors 718–724 and provides output signals indicative of the pressure $P_1$–$P_4$ at the sensors 18–24 on the lines 730–736, respectively. Also, the transceiver/converter 520 may be part of the Velocity Logic 740. The transceiver/converter 520 may be any device that performs the corresponding functions described. In particular, the transceiver/converter 520 together with the optical sensors described hereinbefore may use any type of optical grating-based measurement technique, e.g., scanning interferometric, scanning Fabry Perot, acousto-optic-tuned filter (AOTF), optical filter, time-of-flight, etc., having sufficient sensitivity to measure the ac pressures within the pipe, such as that described in one or more of the following references: A. Kersey et al., "Multiplexed Fiber Bragg Grating Strain-Sensor System With A Fabry-Perot Wavelength Filter," Opt. Letters, Vol. 18, No. 16, Aug. 1993; U.S. Pat. No. 5,493,390, issued Feb. 20, 1996 to Mauro Verasi, et al.; U.S. Pat. No. 5,317,576, issued May 31, 1994, to Ball et al.; U.S. Pat. No. 5,564,832, issued Oct. 15, 1996 to Ball et al.; U.S. Pat. No. 5,513,913, issued May 7, 1996, to Ball et al.; U.S. Pat. No. 5,426,297, issued Jun. 20, 1995, to Dunphy et al.; U.S. Pat. No. 5,401,956, issued Mar. 28, 1995 to Dunphy et al.; U.S. Pat. No. 4,950,883, issued Aug. 21, 1990 to Glenn; U.S. Pat. No. 4,996,419, issued Feb. 26, 1991 to Morey, all of which are incorporated by reference. Also, the pressure sensors described may operate using one or more of the techniques described in the aforementioned references.

III. DETERMINING FLOW RATES OF COMPONENTS IN A MULTIPHASE MIXTURE

Referring once again to FIG. 2, one embodiment of the present invention incorporates downhole sound speed and cross correlation based velocity measurements, as determined by the above described methods and apparatuses, from sensors or sensor systems 32, 34 into the model 16 of known distributed measurement systems. Incorporating these measurements will improve accuracy and robustness as will be described below with reference to a specific example.

Referring to FIG. 2, there is shown an example of an oil/water single zone application of the MPFM 30 of the present invention. One approach would be to utilize a distributed measurement system utilizing sensors 32, 34 which provides only pressure and temperature. Another embodiment is one wherein a single sensor 32 or 34 provides pressure, temperature, sound speed and volumetric flow measurement such as those described in the above referenced patent applications and discussed in detail above. Each approach utilizes fundamentally different approaches, but each also uniquely determines the oil and water flow rates. An overall system optimization considering cost, performance, reliability, etc., would determine the preferred system.

In another embodiment, the present invention includes the combination of the two above described embodiments by incorporation of the sound speed and velocity measurement into the object function of model 16 of the distributed measurement system 30. Adjusting the weighting of each constraint in the now over constrained optimization process could optimize the performance of this particular embodiment.

In yet another embodiment of the present invention, the approach outlined above can be applied to increasingly complicated applications such as three-phase production from a single zone. In this embodiment fluid 12 contains three phases. The combination of sensors 32, 34 in a distributed system utilizes a pressure and temperature sensor 32 in combination with either a bulk velocity or sound speed measurement sensor.

Thus, the combination of the sensors as described is a feasible approach to three-phase measurement from a single zone. As discussed above, the speed of sound and velocity allow the phase fractions in a three-phase flow to be determined. However, in general, there are multiple combinations of oil, water and gas flow rates that could satisfy the precise, but underdetermined constraints for the three-phase embodiment. For this particular embodiment, the flow estimates from the distributed pressure and temperature model can be viewed as providing information to the model to select the best solution of the solutions that satisfy the sound speed and velocity solutions, hence allowing the individual flow rates of the components to be determined as well as their phase fractions.

Figure 32:
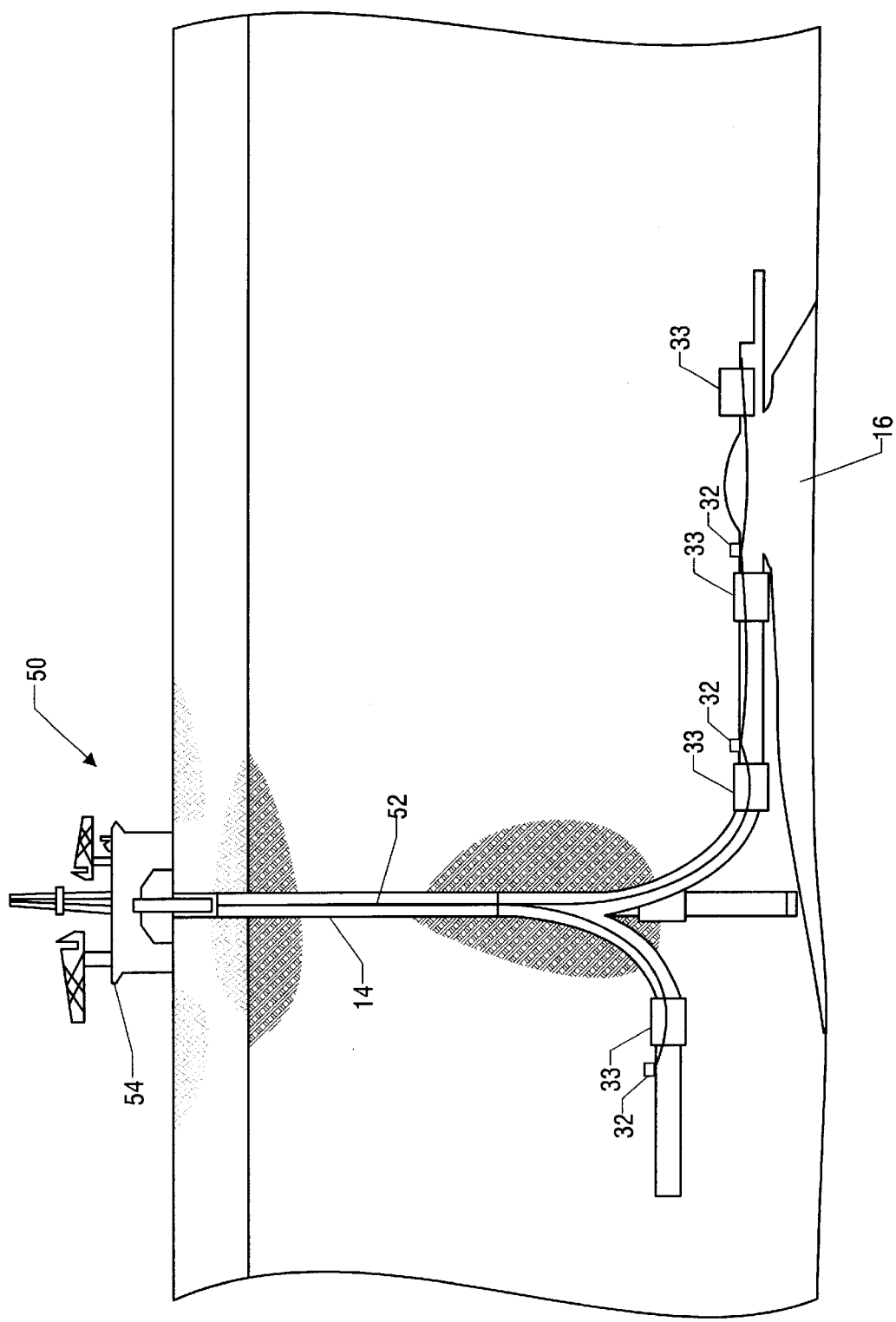
FIG. 32 is a graphical representation of a multizone distributed sensor multiphase flow meter in accordance with the present invention.

Referring to FIG. 32 there is shown a multizone, multiphase production system 50 having distributed temperature and pressure transducers 32 located at various axial positions along pipe 14. The system 50 further comprises multiple distributed sensors or sensor systems 33 located at various axial positions along pipe 14 providing temperature, pressure, speed of sound and/or bulk velocity measurements of the fluid at each location. This embodiment is more complicated than that described previously but derives benefits of combining distributed measurement systems with distributed sound speed and velocity measurements. Each sensor produces a signal communicated to the model 16 via cable 52 located at the platform 54 or a remote location. In the case of multi-zone distributed sensor systems, it is more difficult, and less meaningful, to attempt to isolate the role of each constraint in the overall optimization system. However, utilizing fully distributed sound speed, velocity, pressure and temperature measurements enables one to address systems of arbitrary complexity. In this optimization, all relationships linking the distributed measurements to the desired quantities can and should be exploited.

The sensors 32, 34 may each contain multiple sensors and may comprise any type of sensor capable of measuring the unsteady (or ac or dynamic) pressures within a pipe, such as piezoelectric, optical, capacitive, resistive (e.g., Wheatstone bridge), accelerometers (or geophones), velocity measuring devices, displacement measuring devices, etc. If optical pressure sensors are used, the sensors may be Bragg grating based pressure sensors, such as that described in U.S. Pat. No. 6,016,702, entitled "High Sensitivity Fiber Optic Pressure Sensor For Use In Harsh Environments." Alternatively, the sensors may be electrical or optical strain gauges attached to or embedded in the outer or inner wall of the pipe and which measure pipe wall strain, including microphones, hydrophones, or any other sensor capable of measuring the unsteady pressures within the pipe. In an embodiment of the present invention that utilizes fiber optics as the pressure sensors the pressure sensors may be connected individually or may be multiplexed along one or more optical fibers using wavelength division multiplexing (WDM), time division multiplexing (TDM), or any other optical multiplexing techniques (discussed more hereinafter). Alternatively, a portion or all of the fiber between the gratings (or including the gratings, or the entire fiber, if desired) may be doped with a rare earth dopant (such as erbium) to create a tunable fiber laser, such as is described in U.S. Pat. No. 5,317,576, entitled "Continuously Tunable Single Mode Rare-Earth Doped Laser Arrangement," to Ball et al., or U.S. Pat. No. 5,513,913, entitled "Active Multipoint Fiber Laser Sensor," to Ball et al., or U.S. Pat. No. 5,564,832, entitled "Birefringent Active Fiber Laser Sensor," to Ball et al., all of which are incorporated herein by reference.

For any of the embodiments described, the pressure sensors, including electrical strain gauges, optical fibers and/or gratings among others as described, may be attached to the pipe by adhesive, glue, epoxy, tape or other suitable attachment means to ensure suitable contact between the sensor and the pipe. The sensors may alternatively be removable or permanently attached via known mechanical techniques such as by mechanical fastener, by a spring loaded arrangement, by clamping, by a clam shell arrangement, by strapping or by other equivalents. Alternatively, the strain gauges, including optical fibers and/or gratings, may be embedded in a composite pipe. If desired, for certain applications, the gratings may be detached from (or strain or acoustically isolated from) the pipe if desired.

The present invention allows the speed of sound to be determined in a pipe independent of pipe orientation, i.e., vertical, horizontal, or any orientation therebetween. Also, the invention does not require any disruption to the flow within the pipe (e.g., an orifice or venturi). Further, the invention may use ac (or unsteady or dynamic) pressure measurements as opposed to static (dc) pressure measurements and is therefore less sensitive to static shifts (or errors) in sensing. Furthermore, if harsh environment fiber optic pressure sensors are used to obtain the pressure measurements, such sensors eliminate the need for any electronic components down-hole, thereby improving reliability of the measurement.

In the embodiments shown and discussed, some or all of the functions within the model 16 and/or Logic (140, 160, 740) may be implemented in software (using a microprocessor or computer) and/or firmware, or may be implemented using analog and/or digital hardware, having sufficient memory, interfaces, and capacity to perform the functions described.

It should be understood that any of the features, characteristics, alternatives or modifications described regarding a particular embodiment may also be applied, used, or incorporated with any other embodiment described.

Although the invention has been described and illustrated with respect to exemplary embodiments thereof, the foregoing and various other additions and omissions may be made therein and thereto without departing from the spirit and scope of the present invention.

What is claimed is:

1. A sensing system for measuring a fluid mixture in a pipe, comprising:
   a first temperature sensor for providing a first temperature signal indicative of the temperature of the fluid mixture;
   a first pressure sensor for providing a first pressure signal indicative of the pressure of the fluid mixture;
   a velocity sensor for providing a velocity signal indicative of the velocity of the fluid mixture, wherein the velocity sensor passively senses pressure disturbances occurring within the fluid mixture without detecting acoustical energy added to the fluid mixture by the sensing system;
   a sound speed sensor for providing a sound speed signal indicative of the fluid sound speed in the fluid mixture, wherein the sound speed sensor passively senses pressure disturbances occurring within the fluid mixture without detecting acoustical energy added to the fluid mixture by the sensing system; and
   a logic system for receiving the first temperature signal, the first pressure signal, the velocity signal, and the sound speed signal.

2. The sensing system of claim 1, wherein the first temperature sensor, the first pressure sensor, the velocity sensor, and the sound speed sensor are located at a first axial location along the pipe.

3. The sensing system of claim 2 further comprising a second pressure sensor at a second axial location along the pipe for providing a second pressure signal that is received by the logic system.

4. The sensing system of claim 2 further comprising a second temperature sensor at a second axial location along the pipe for providing a second temperature signal that is received by the logic system.

5. The sensing system of claim 2 further comprising a second pressure sensor and a second temperature sensor at a second axial location along the pipe for providing a second pressure signal and a second temperature signal that are received by the logic system.

6. The sensing system of claim 1, wherein the first temperature sensor and the first pressure sensor are located at a first axial location along the pipe and the velocity sensor and the sound speed sensor are located at a second axial location along the pipe.

7. The sensing system of claim 6 further comprising a second pressure sensor at a third axial location along the pipe for providing a second pressure signal that is received by the logic system.

8. The sensing system of claim 6 further comprising a second temperature sensor at a third axial location along the pipe for providing a second temperature signal that is received by the logic system.

9. The sensing system of claim 6 further comprising a second pressure sensor and a second temperature sensor at a third axial location along the pipe for providing a second pressure signal and a second temperature signal that are received by the logic system.

10. The sensing system of claim 1, wherein the first temperature sensor comprises a Bragg grating formed in an optical fiber.

11. The sensing system of claim 1, wherein the first pressure sensor comprises a Bragg grating formed in an optical fiber.

12. The sensing system of claim 1, wherein the velocity sensor comprises a plurality of fiber optic pressure sensors.

13. The sensing system of claim 12, wherein the plurality of pressure sensors comprise a series of wraps around the pipe.

14. The sensing system of claim 13, wherein the wraps in the series are separated by Bragg gratings.

15. The sensing system of claim 1, wherein the sound speed sensor comprises a plurality of fiber optic pressure sensors.

16. The sensing system of claim 15, wherein the plurality of pressure sensors comprise a series of wraps around the pipe.

17. The sensing system of claim 16, wherein the wraps in the series are separated by Bragg gratings.

18. The sensing system of claim 1, wherein the sound speed sensor provides sound speed signals below 20 kHz.

19. A method for measuring a fluid mixture in a pipe with a sensing system, comprising:

measuring a temperature of the fluid mixture and providing a first temperature signal indicative of the measured temperature using a first temperature sensor along the pipe;

measuring a pressure of the fluid mixture and providing a first pressure signal indicative of the measured pressure using a first pressure sensor along the pipe;

using a velocity sensor along the pipe to passively measure pressure disturbances indicative of a velocity of the fluid mixture without detecting acoustical energy added to the fluid mixture by the sensing system and providing a signal indicative of the measured velocity;

using a sound speed sensor along the pipe to passively measure pressure disturbances indicative of a sound speed of the fluid mixture without detecting acoustical energy added to the fluid mixture by the sensing system and providing a signal indicative of the measured sound speed; and receiving the first temperature signal, first pressure signal, velocity signal and sound speed signal for use by a logic system.

20. The method of claim 19, wherein the first temperature sensor, the first pressure sensor, the velocity sensor, and the sound speed sensor are located at a first axial location along the pipe.

21. The method of claim 20 further comprising measuring a pressure of the fluid mixture and providing a second pressure signal indicative of the measured pressure that is received by the logic system using a second pressure sensor at a second axial location along the pipe.

22. The method of claim 20 further comprising measuring a temperature of the fluid mixture and providing a second temperature signal indicative of the measured temperature that is received by the logic system using a second temperature sensor at a second axial location along the pipe.

23. The method of claim 19, wherein the first temperature sensor and the first pressure sensor are located at a first axial location along the pipe and the velocity sensor and the sound speed sensor are located at a second axial location along the pipe.

24. The method of claim 23 further comprising measuring a pressure of the fluid mixture and providing a second pressure signal indicative of the measured pressure that is received by the logic system using a second pressure sensor at a third axial location along the pipe.

25. The method of claim 23 further comprising measuring a temperature of the fluid mixture and providing a second temperature signal indicative of the measured temperature that is received by the logic system using a second temperature sensor at a third axial location along the pipe.

26. The method of claim 19, wherein the first temperature sensor comprises a Bragg grating formed in an optical fiber.

27. The method of claim 19, wherein the first pressure sensor comprises a Bragg grating formed in an optical fiber.

28. The method of claim 19, wherein the velocity sensor comprises a plurality of fiber optic pressure sensors.

29. The method of claim 28, wherein the plurality of pressure sensors comprise a series of wraps around the pipe.

30. The method of claim 29, wherein the wraps in the series are separated by Bragg gratings.

31. The method of claim 19, wherein the sound speed sensor comprises a plurality of fiber optic pressure sensors.

32. The method of claim 31, wherein the plurality of pressure sensors comprise a series of wraps around the pipe.

33. The method of claim 32, wherein the wraps in the series are separated by Bragg gratings.

34. The method of claim 19, wherein the sound speed sensor provides a sound speed signal below 20 kHz.

\* \* \* \* \*